United States Patent
Yu et al.

(10) Patent No.: US 10,959,240 B2
(45) Date of Patent: Mar. 23, 2021

(54) PROVIDING QUALITY-OF-SERVICE IN WIRELESS COMMUNICATIONS

(71) Applicant: QUALCOMM Incorporated, San Diego, CA (US)

(72) Inventors: Yu-Ting Yu, Union City, CA (US); Gavin Bernard Horn, La Jolla, CA (US); Stefano Faccin, San Ysidro, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/452,265

(22) Filed: Mar. 7, 2017

(65) Prior Publication Data
US 2017/0303287 A1    Oct. 19, 2017

Related U.S. Application Data

(60) Provisional application No. 62/323,546, filed on Apr. 15, 2016.

(51) Int. Cl.
*H04W 72/08* (2009.01)
*H04W 28/02* (2009.01)
(Continued)

(52) U.S. Cl.
CPC ....... *H04W 72/085* (2013.01); *H04L 61/2007* (2013.01); *H04L 61/6022* (2013.01); *H04L 67/146* (2013.01); *H04W 28/0263* (2013.01)

(58) Field of Classification Search
CPC ............. H04L 61/2007; H04L 61/6022; H04L 67/146; H04W 28/0263; H04W 72/085
See application file for complete search history.

(56) References Cited

U.S. PATENT DOCUMENTS 9,509,575 B2 * 11/2016 Zhang ................. H04L 43/028
2012/0092992 A1 * 4/2012 Pappas ................ H04L 47/2491
370/235
(Continued)

FOREIGN PATENT DOCUMENTS

WO    WO-2016003805 A1    1/2016

OTHER PUBLICATIONS

Allot Communications: "Tunnelling Methods between the TDF and the P-GW and Enhancements for Solutions 3, 5, 6", SA WG2 Meeting S2#98, S2-132977, Revision of S2-132963, Jul. 18, 2013, XP050726271, Retrieved from the Internet: URL:http://www.3gpp.org/ftp/tsg_sa/WG2_Arch/TSGS2_98_Valencia/Docs/, 12 pages.
(Continued)

*Primary Examiner* — Saad A. Waqas
(74) *Attorney, Agent, or Firm* — Arent Fox, LLP

(57) ABSTRACT

Aspects described herein relate to managing service data flows and corresponding data radio bearers. An indication of a binding between a service data flow and a data radio bearer with an access point can be received. The data radio bearer for binding to the service data flow can be determined as either an existing data radio bearer that supports one or more quality-of-service (QoS) parameters of the service data flow or a new data radio bearer to support one or more data flows of the service data flow. An existing data radio bearer can be modified or a new data radio bearer can be established based on the determination. Based on the binding, a packet can be transmitted using the data radio bearer based at least in part on classifying the packet as related to the service data flow.

30 Claims, 13 Drawing Sheets

(51) Int. Cl.
*H04L 29/12* (2006.01)
*H04L 29/08* (2006.01)

(56) References Cited

U.S. PATENT DOCUMENTS

| | | | |
|---|---|---|---|
| 2014/0078971 A1* | 3/2014 | Bontu | H04W 8/005 |
| | | | 370/329 |
| 2015/0009826 A1* | 1/2015 | Ma | H04W 28/0289 |
| | | | 370/235 |
| 2016/0156676 A1* | 6/2016 | Verin | H04L 65/1016 |
| | | | 709/228 |
| 2017/0019816 A1* | 1/2017 | Yuan | H04W 28/24 |
| 2017/0142611 A1* | 5/2017 | Andgart | H04W 28/24 |
| 2017/0188404 A1* | 6/2017 | Fodor | H04W 76/14 |
| 2017/0288886 A1* | 10/2017 | Atarius | H04L 12/1407 |
| 2018/0317118 A1* | 11/2018 | Jung | H04W 28/0231 |
| 2019/0159072 A1* | 5/2019 | Zhu | H04W 28/24 |

OTHER PUBLICATIONS

International Search Report and Written Opinion issued in International Patent Application No. PCT/US2017/021372, dated Jun. 21, 2017 (15 pages).
3GPP TS 23.203, 3rd Generation Partnership Project; Technical Specification Group Services and System Aspects; Policy and charging control architecture, Release 12, V12.7.0, Dec. 2014, 222 Pages.
3GPP TS 23.401, 3rd Generation Partnership Project; Technical Specification Group Services and System Aspects; General Packet Radio Service (GPRS) enhancements for Evolved Universal Terrestrial Radio Access Network (E-UTRAN) access, Release 12, V12.7.0 (Dec. 2014), 308 pages.
3GPP TS 24.301, 3rd Generation Partnership Project; Technical Specification Group Core Network and Terminals; Non-Access-Stratum (NAS) protocol for Evolved Packet System (EPS); Stage 3, Release 12, V12.7.0, Dec. 2014, 372 pages.

* cited by examiner

PROVIDING QUALITY-OF-SERVICE IN WIRELESS COMMUNICATIONS

CLAIM OF PRIORITY UNDER 35 U.S.C. § 119

The present Application for Patent claims priority to Provisional Application No. 62/323,546, entitled "PROVIDING QUALITY-OF-SERVICE IN WIRELESS COMMUNICATIONS" filed Apr. 15, 2016, which is assigned to the assignee hereof and hereby expressly incorporated by reference herein for all purposes.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple user equipment devices (UE). Each UE communicates with one or more base stations, such as an evolved Node B (eNB) via transmissions on the forward and reverse links. The forward link (or downlink) refers to the communication link from the eNBs to the UEs, and the reverse link (or uplink) refers to the communication link from the UEs to the eNBs. This communication link may be established via a single-in-single-out, multiple-in-single-out or a multiple-in-multiple-out (MIMO) system. In this regard, the UEs can access wireless network via one or more eNBs.

In systems such as LTE, an evolved packet system (EPS) bearer is established between a UE and a core network to facilitate communications therebetween, and the UE can establish a data radio bearer (DRB) for radio access network (RAN) communications with the eNB, where the DRB can be bound to the EPS bearer. Multiple EPS bearers with the core network, and corresponding DRBs between the UE and eNB, are used for providing a quality-of-service (QoS) to a given traffic flow between the UE and the core network. A bearer establishes a "virtual" connection between two endpoints so that traffic can be sent between them. The bearer acts as a pipeline between the two endpoints. This coupling between EPS bearers and DRBs requires the core network to manage EPS bearers for each DRB to provide the prescribed QoS.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for communicating in a wireless network is provided. The method includes receiving an indication of a binding between a service data flow and a data radio bearer with an access point, determining the data radio bearer for binding to the service data flow as either an existing data radio bearer that supports one or more quality-of-service (QoS) parameters of the service data flow or a new data radio bearer to support one or more data flows of the service data flow, modifying an existing data radio bearer or establishing a new data radio bearer based on the determination, and transmitting, based on the binding, a packet using the data radio bearer based at least in part on classifying the packet as related to the service data flow.

In other aspects, a method for communicating in a wireless network is provided. The method includes determining a data radio bearer for binding to a service data flow as one of an existing data radio bearer that supports one or more QoS parameters of the service data flow or a new data radio bearer, and indicating, to a wireless device, whether the data radio bearer is the existing data radio bearer or the new data radio bearer.

In another aspect, an apparatus for wireless communications is provided that includes a transceiver for communicating one or more wireless signals via one or more antennas, a memory configured to store instructions, and one or more processors communicatively coupled with the transceiver and the memory. The one or more processors are configured to receive an indication of a binding between a service data flow and a data radio bearer with an access point, determine the data radio bearer for binding to the service data flow as either an existing data radio bearer that supports one or more QoS parameters of the service data flow or a new data radio bearer to support one or more data flows of the service data flow, modify the existing data radio bearer or establishing the new data radio bearer based on the determination, and transmit, based on the binding, a packet using the data radio bearer based at least in part on classifying the packet as related to the service data flow.

In another example, an apparatus for wireless communications is provided that includes a transceiver for communicating one or more wireless signals via one or more antennas, a memory configured to store instructions, and one or more processors communicatively coupled with the transceiver and the memory. The one or more processors are configured to determine a data radio bearer for binding to a service data flow as one of an existing data radio bearer that supports one or more quality-of-service (QoS) parameters of the service data flow or a new data radio bearer, and indicate, to a wireless device, whether the data radio bearer is the existing data radio bearer or the new data radio bearer To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
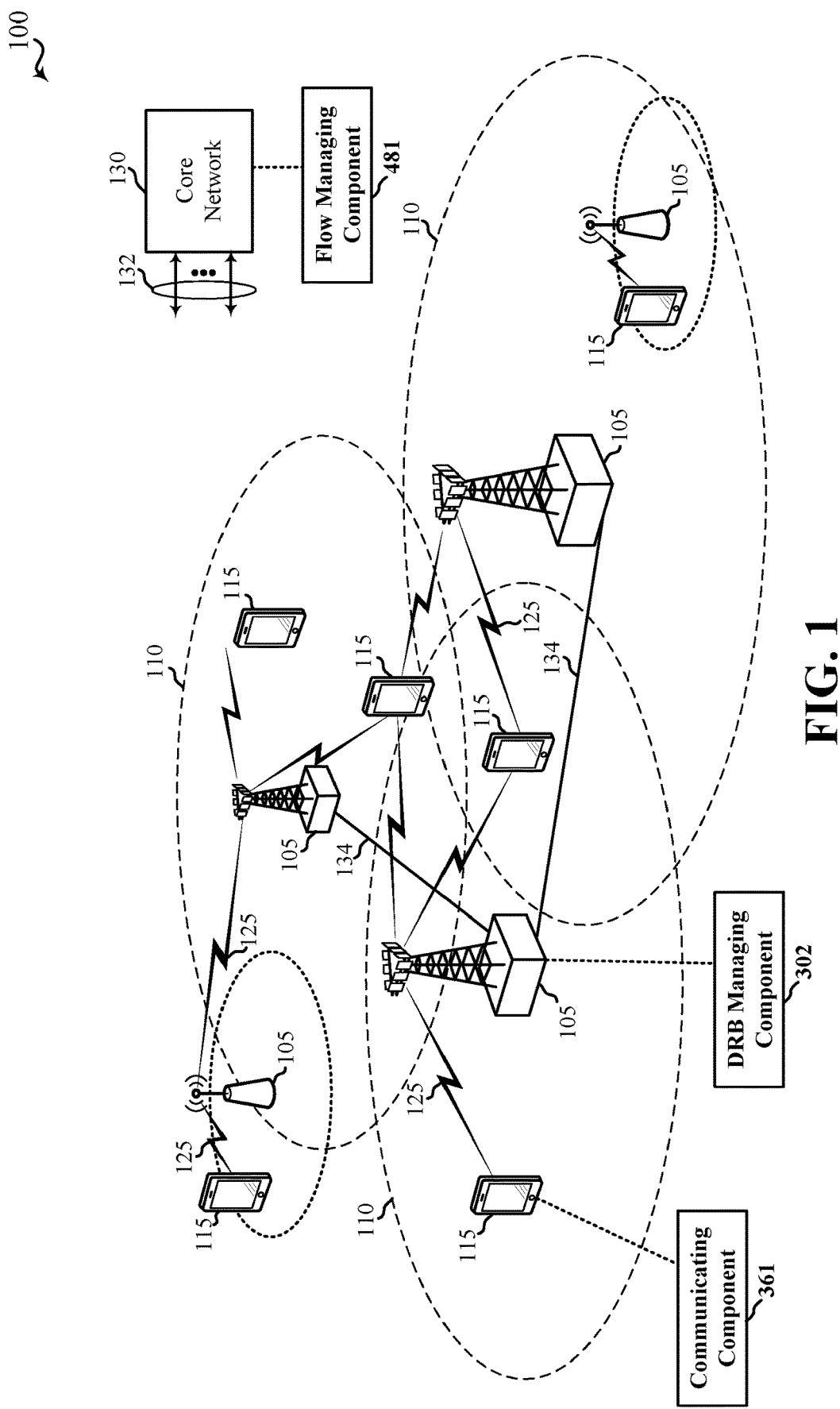
FIG. 1 shows a block diagram conceptually illustrating an example of a telecommunications system, in accordance with aspects described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to managing quality-of-service (QoS) for one or more traffic flows (also referred to herein as service data flows (SDF)) for a wireless device over a single connection with a core network. An SDF can be defined by a Traffic Flow Template (TFT) defined by the core network. A core network component, e.g. a mobility management entity (MME), can provide the TFT of a SDF and/or its associated QoS treatment parameters to the radio access network (RAN). The QoS definition may be initiated by policy and charging rules function (PCRF), a user plane gateway, a home subscriber server (HSS), etc. For example, an access point can establish one or more data radio bearers (DRB) with a wireless device based on a QoS parameter of one or more SDFs. A DRB can define over-the-air packet treatments in the RAN such that packets mapped to the same DRB can receive the same packet forwarding treatments, e.g. scheduling policy, queue management policy, rate shaping policy, radio link control (RLC) configuration, etc. A DRB may be established, released or modified by the RAN to establish QoS in over-the-air wireless communications with a user equipment (UE) or other device. The establishment or modification of a DRB can be by a radio resource control (RRC) procedure.

The QoS parameter may correspond to a QoS requested for the SDF (e.g., a bit rate or other throughput parameter, etc.). An association between the Policy and Charging Control (PCC) rules and a bearer can be referred to as a bearer binding. A PCC rule is mapped to a corresponding bearer in the access network to ensure that subscriber packets receive the appropriate quality of service (QoS), charging, and gating control. The policy and charging enforcement function (PCEF) can perform the bearer binding. User (or UE) traffic (e.g., IP flows) may be classified into different SDFs having different QoS classes by a network based on the type of the service that is being provided through the SDFs. For example, service types of the SDFs may include voice services (e.g., voice over IP, Internet services, etc.). Then, the QoS rules can be applied to each SDF by the network.

In an example, the access point may not establish separate bearers with a core network for each SDF, but may manage QoS for the SDFs over the one or more DRBs with the UE (or other device). For example, the access point may determine whether, for a given SDF, a current DRB has associated QoS treatment parameters that can support the QoS parameter of the SDF or determine whether to establish a new DRB for the SDF to support the QoS parameter of the SDF. The QoS treatment parameters may correspond to the DRB configuration such as a packet data convergence protocol (PDCP) or radio link control (RLC) parameters, a maximum and/or minimum delay (or delay budget, delay requirement, etc.) of the DRB, throughput budget of the DRB (throughput budget, minimum throughput requirement, etc.), priority of the DRB, etc. used to achieve a certain QoS requirement from the core network. In this regard, for example, the access point may aggregate SDFs having the same or similar QoS parameter (e.g., a desired or required QoS) to a DRB that can support the QoS parameter. For example, the access point may include multiple TFTs in a DRB binding that bind the DRB to multiple SDFs. Thus, in an example, the access point may have a one-to-many mapping of DRBs to transport with the core network.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, user equipment, or user equipment device. A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, access node, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (WiFi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN (WLAN), BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. One or more of access points 105 can include a DRB managing component 302 for managing DRBs for related SDFs of one or more UEs 115. One or more of UEs 115 can include a communicating component 361 for communicating with the one or more access points 105 over the one or more DRBs corresponding to related SDFs with core network 130. In addition, the core network 130 may include a flow managing component 481 for managing SDFs with the one or more UEs 115 via one or more access points 105.

Some of the access points 105 may communicate with the UEs 115 under the control of a base station controller (not shown), which may be part of the core network 130 or the access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each of communication links 125 may be a multi-carrier signal modulated according to the various radio technologies described above. Each modulated signal may be sent on a different carrier and may carry control information (e.g., reference signals, control channels, etc.), overhead information, data, etc.

In this regard, a UE 115 can be configured to communicate with one or more access points 105 over multiple carriers using carrier aggregation (CA) (e.g., with one access point 105) and/or multiple connectivity (e.g., with multiple access points 105). In either case, UE 115 can be configured with at least one primary cell (PCell) configured to support uplink and downlink communications between UE 115 and an access point 105. In an example, there can be a PCell for each of communication links 125 between a UE 115 and a given access point 105. In addition, each of the communication links 125 can have one or more secondary cells (SCell) that can support uplink and/or downlink communications as well. In some examples, the PCell can be used to communicate at least a control channel, and the SCell can be used to communicate a data channel.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for an access point may be divided into sectors making up a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas 110 of different access points 105, including the coverage areas of the same or different types of access points 105, utilizing the same or different radio access technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A network in which different types of access points 105 provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may covers a relatively large geographic area (e.g., several kilometers in radius) and may allow unrestricted access by UEs 115 with service subscriptions with the network provider. A small cell may cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells. The term eNB, as used generally herein, may relate to a macro eNB and/or a small cell eNB.

In an example, a small cell may operate in an "unlicensed" frequency band or spectrum, which can refer to a portion of radio frequency (RF) space that is not licensed for use by one or more wireless wide area network (WWAN) technologies, but may or may not be used by other communication technologies (e.g., wireless local area network (WLAN) technologies, such as Wi-Fi). Moreover, a network or device that provides, adapts, or extends its operations for use in an "unlicensed" frequency band or spectrum may refer to a network or device that is configured to operate in a contention-based radio frequency band or spectrum. In addition, for illustration purposes, the description below may refer in some respects to an LTE system operating on an unlicensed band by way of example when appropriate, although such descriptions are not intended to exclude other cellular communication technologies. LTE on an unlicensed band may also be referred to herein as LTE/LTE-Advanced in unlicensed spectrum, or simply LTE, in the surrounding context.

The core network 130 may communicate with the eNBs or other access points 105 via a backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), multiple connectivity (e.g., CA with each of one or more access points 105) or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer.

Figure 2:
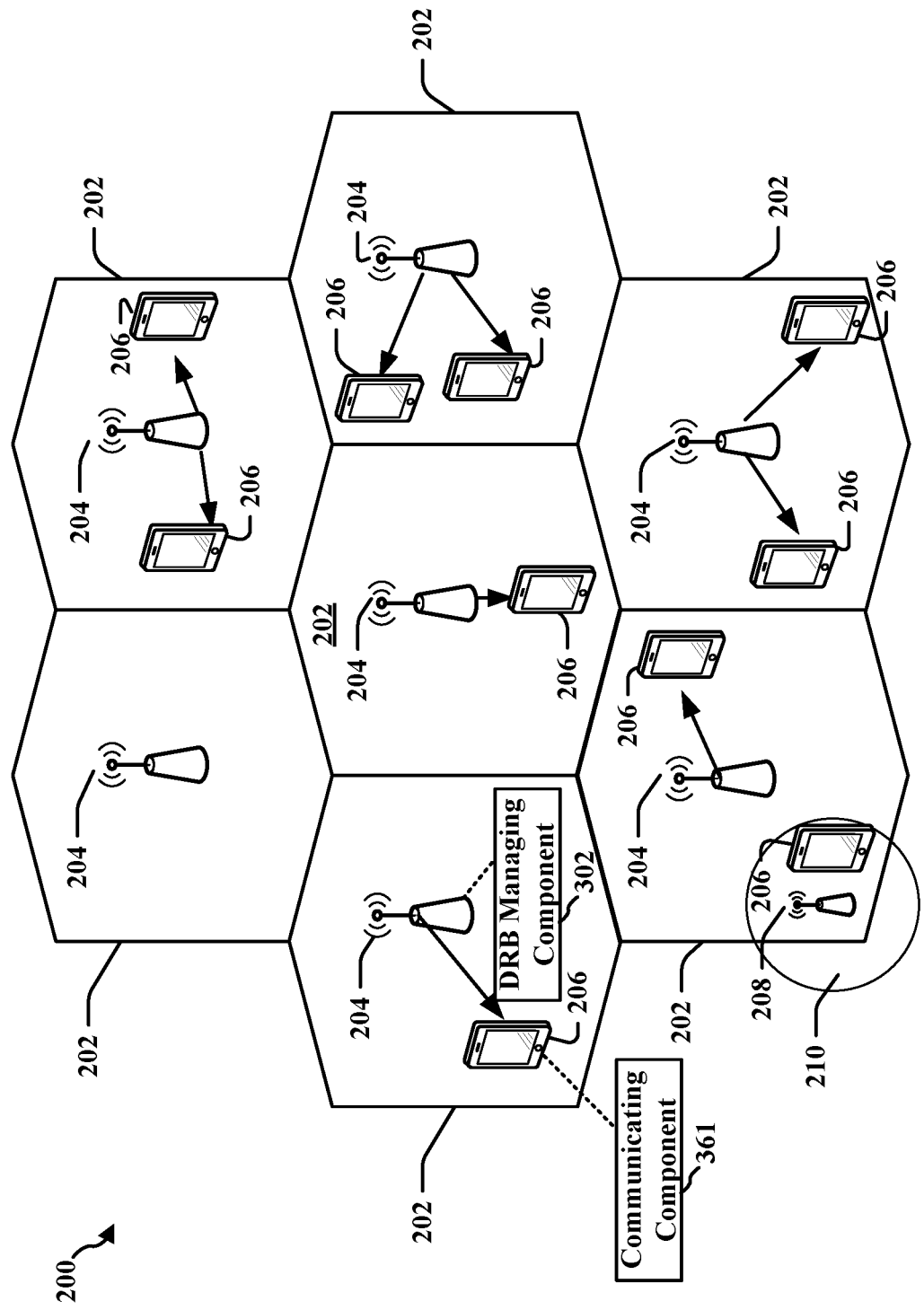
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more small cell eNBs 208 may have cellular regions 210 that overlap with one or more of the cells 202. The small cell eNBs 208 may be of a lower power class (e.g., home eNB (HeNB)), femto cell, pico cell, micro cell, or remote radio head (RRH). The macro eNBs 204 are each assigned to a respective cell 202 and are configured to provide an access point to the core network 130 for all the UEs 206 in the cells 202. In an aspect, one or more of eNBs 204, small cell eNBs 208, etc. can include a DRB managing component 302 for managing DRBs with one or more UEs for related SDFs in the core network. One or more of UEs 206 can include a communicating component 361 for communicating with the one or more eNBs 204/208 over the one or more DRB corresponding to related SDFs with a core network. There is no centralized controller shown in this example of an access network 200, but a centralized controller may be used in alternative configurations. The eNBs 204/208 can be responsible for all radio related functions including radio bearer control, admission control, mobility control, scheduling, security, and connectivity to a serving gateway.

The modulation and multiple access scheme employed by the access network 200 may vary depending on the particular telecommunications standard being deployed. In LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good (e.g., when one or more measured channel condition parameters achieve one or more thresholds). When channel conditions are less favorable (e.g., when one or more measured channel condition parameters do not achieve one or more thresholds), beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
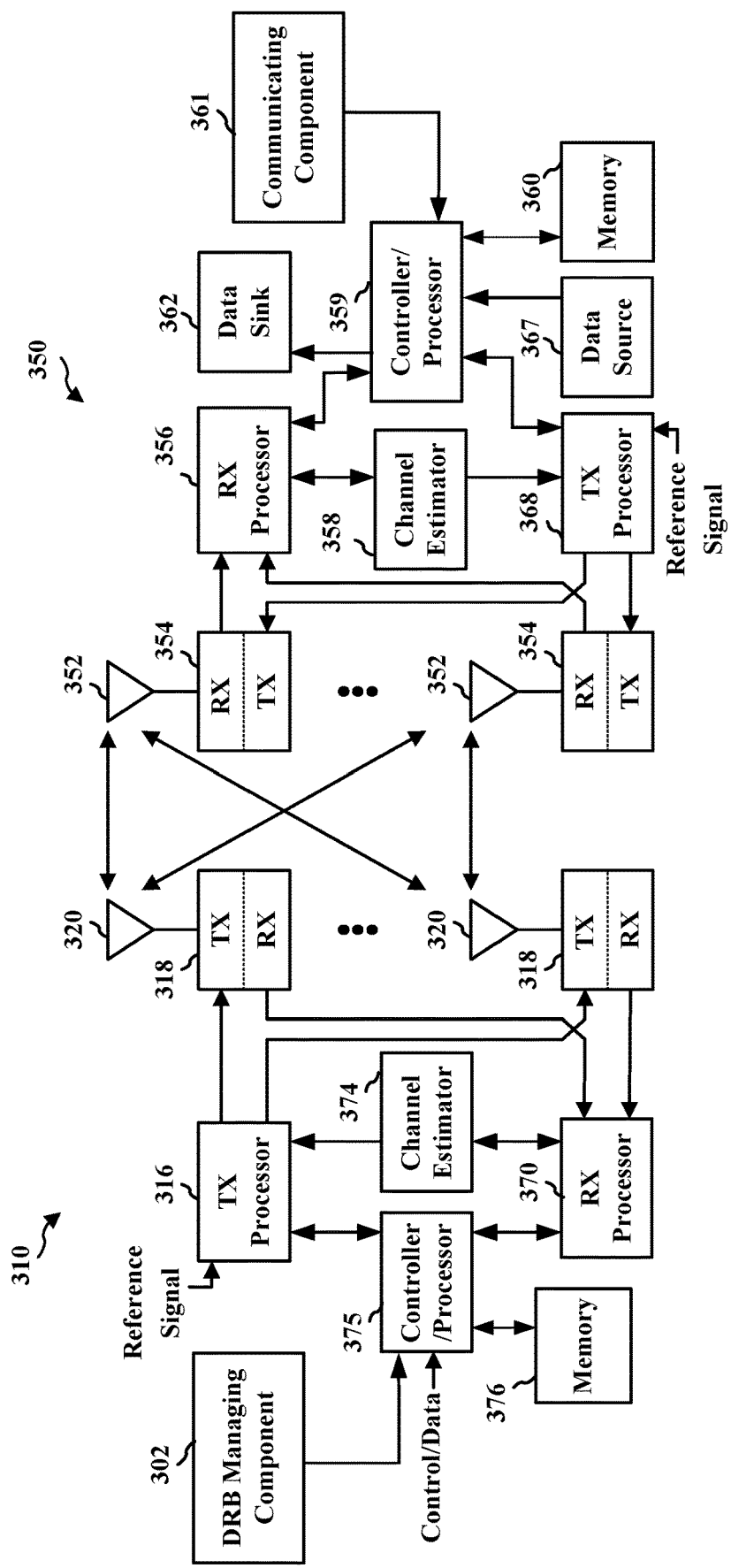
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for hybrid automatic repeat/request (HARD) operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. eNB 310 can include a DRB managing component 302 for managing DRBs for related SDFs of one or more UEs 350. Though DRB managing component 302 is shown as coupled to controller/processor 375, in an example DRB managing component 302 can also be coupled to other processors (e.g., TX processor 316, RX processor 370, etc.) and/or implemented by the one or more processors 316, 375, 370 to perform actions described herein.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. In addition, UE 350 may include a communicating component 361 for communicating with the one or more eNBs 310 over the one or more DRB corresponding to related SDFs with a core network. Though communicating component 361 is shown as coupled to controller/processor 359, in an example communicating component 361 can also be coupled to other processors (e.g., RX processor 356, TX processor 368, etc.) and/or implemented by the one or more processors 356, 359, 368 to perform actions described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

In future wireless communications technology, such as 5G, the core network may do away from the end-to-end QoS bearer model due to various reasons. For example, it may be desired to reduce the QoS bearer set-up delay for short-lived QoS sessions. In practice, the core network paths may be over-provisioned and thus the bottleneck of QoS may reside in the air interface. In addition, the potential use of software-defined networking solution for routing path/tunneling control leads to the desire of a flat routing, bearerless model in core network. While the core network adopts a bearerless model, data radio bearer (DRB) support in RAN may still be desired or required. The RLC and MAC scheduling configurations may be differentiated in order to support certain QoS requirements, e.g. reliability and delay. In a bearerless core network model, the responsibility of associating the flows with various QoS to a DRB may be in RAN. Described below are examples of RAN QoS handling.

Figure 4A:
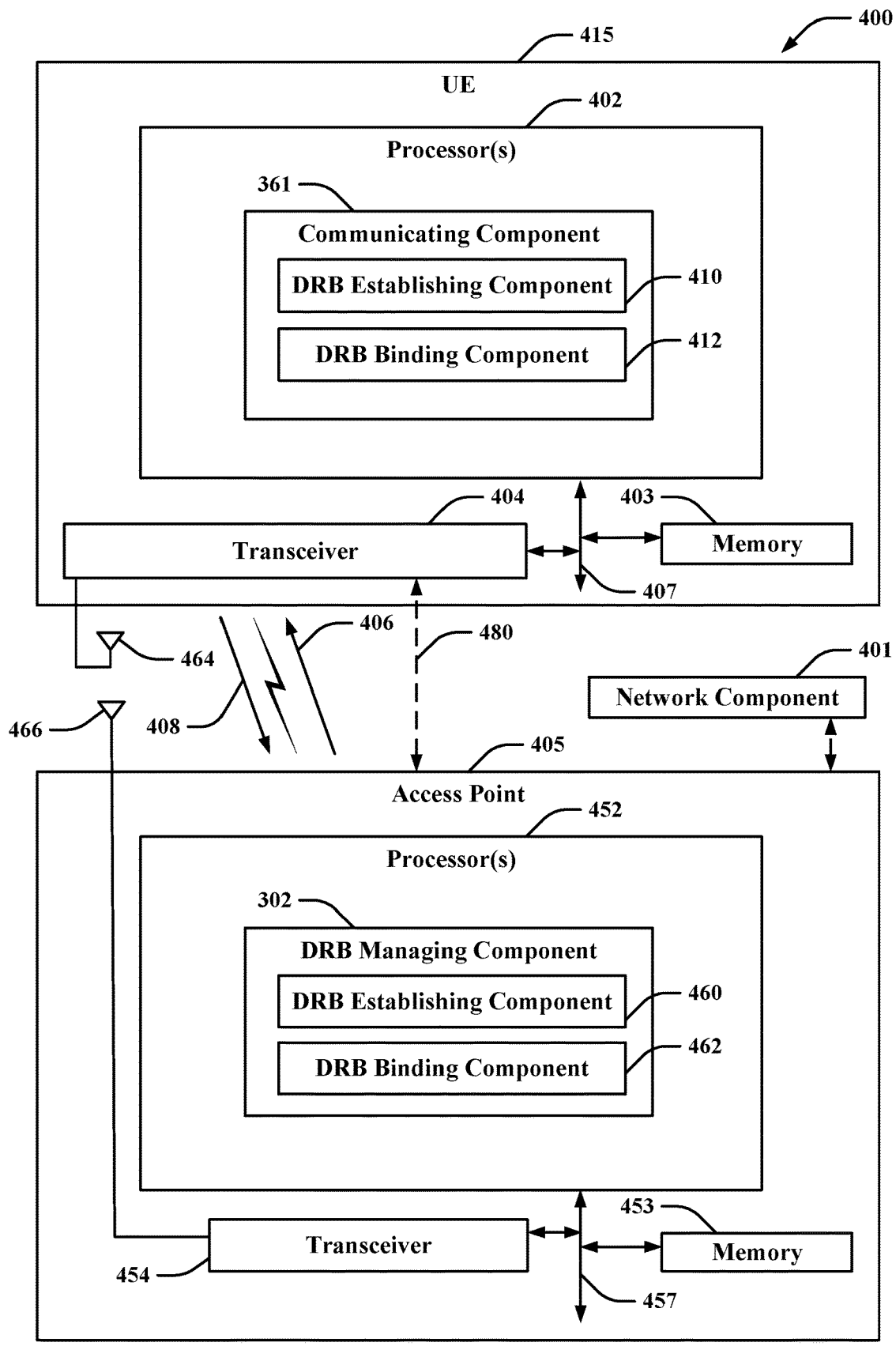
FIG. 4A illustrates an example of a system for managing service data flows (SDF) and corresponding data radio bearers (DRB) in accordance with aspects described herein.
Figure 4B:
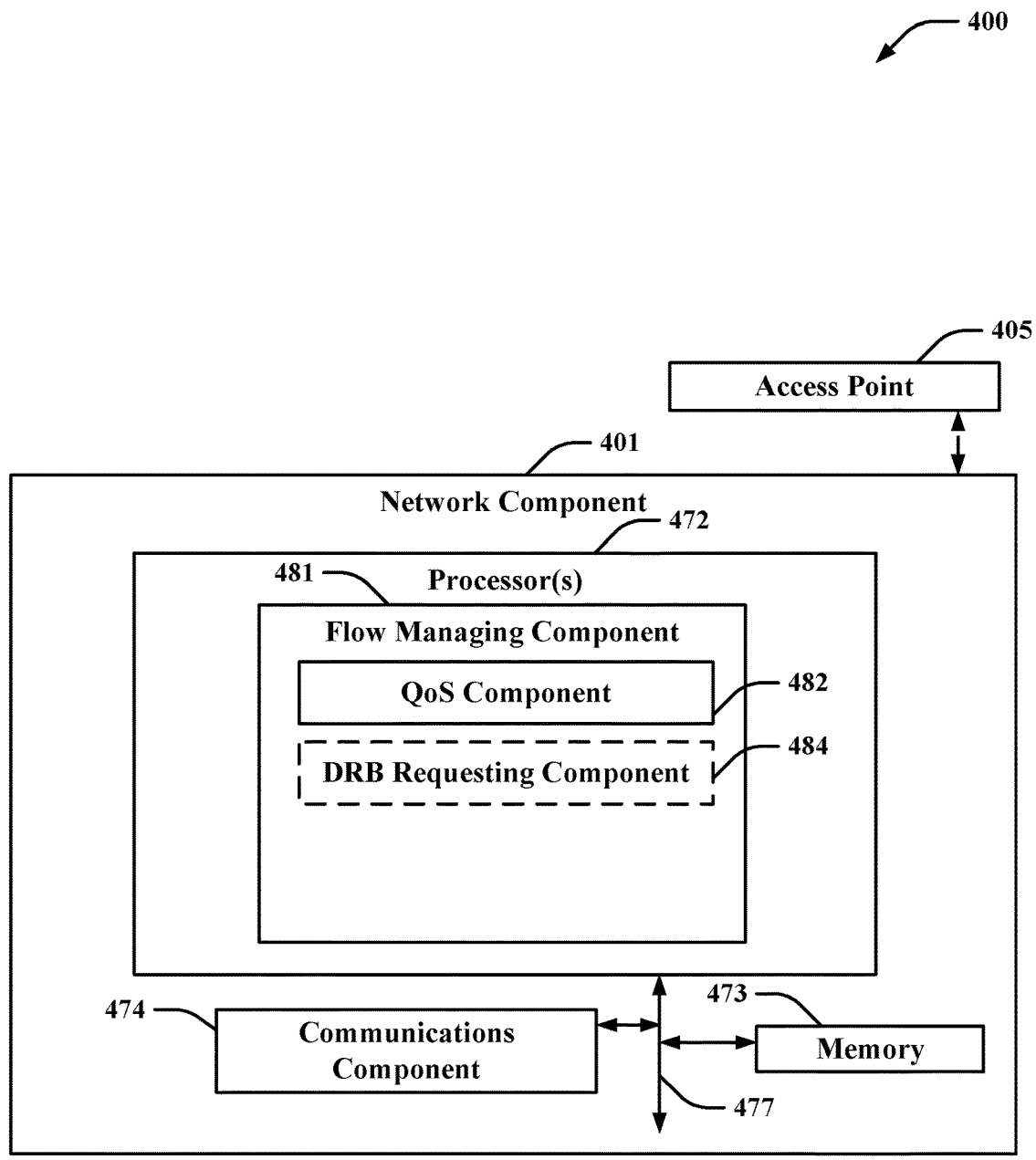
FIG. 4B illustrates an example of a network component of a system for managing service data flows (SDF) and corresponding data radio bearers (DRB) in accordance with aspects described herein.
Figure 5:
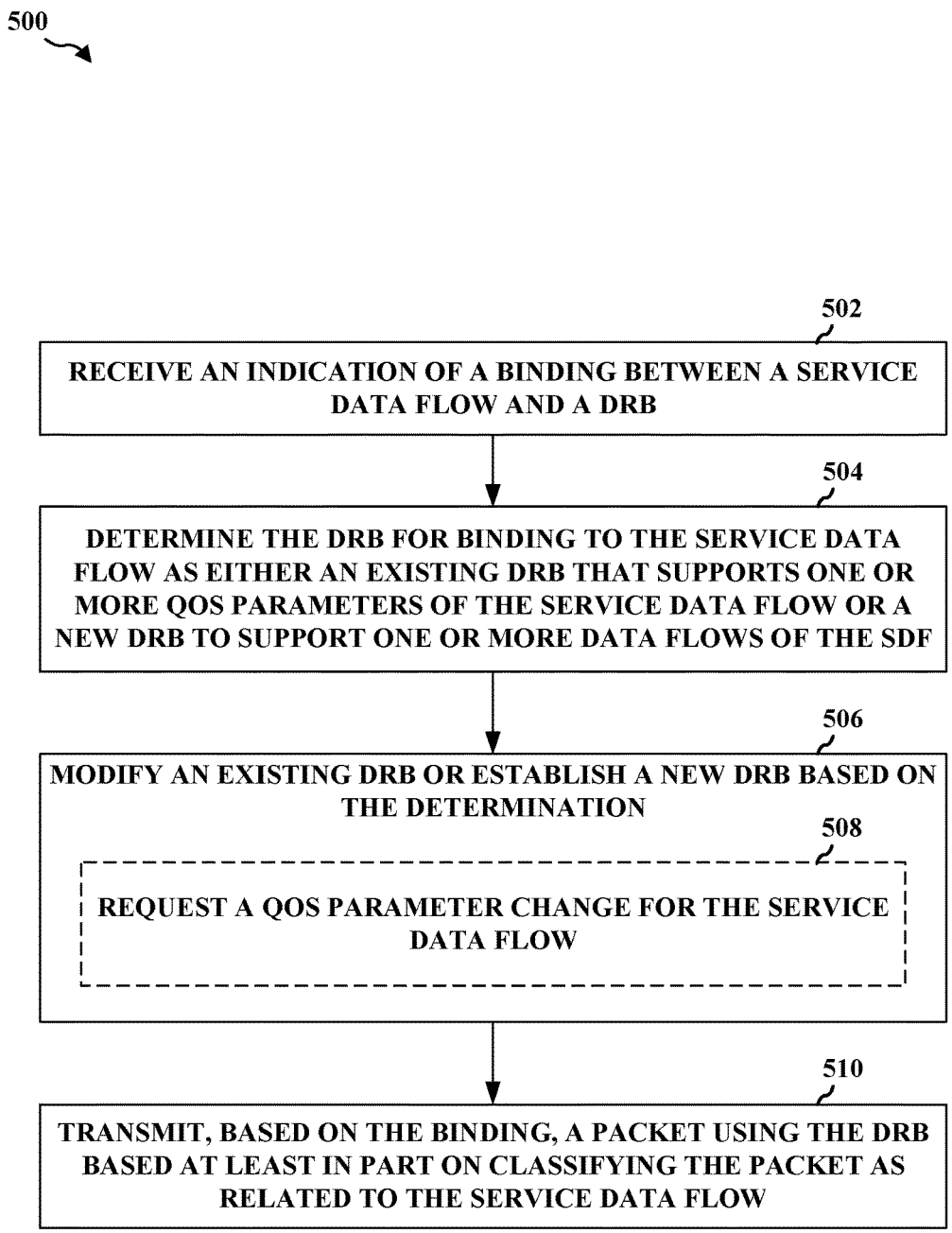
FIG. 5 illustrates an example of a method for utilizing a DRB for transmitting a packet related to a SDF in accordance with aspects described herein.
Figure 6:
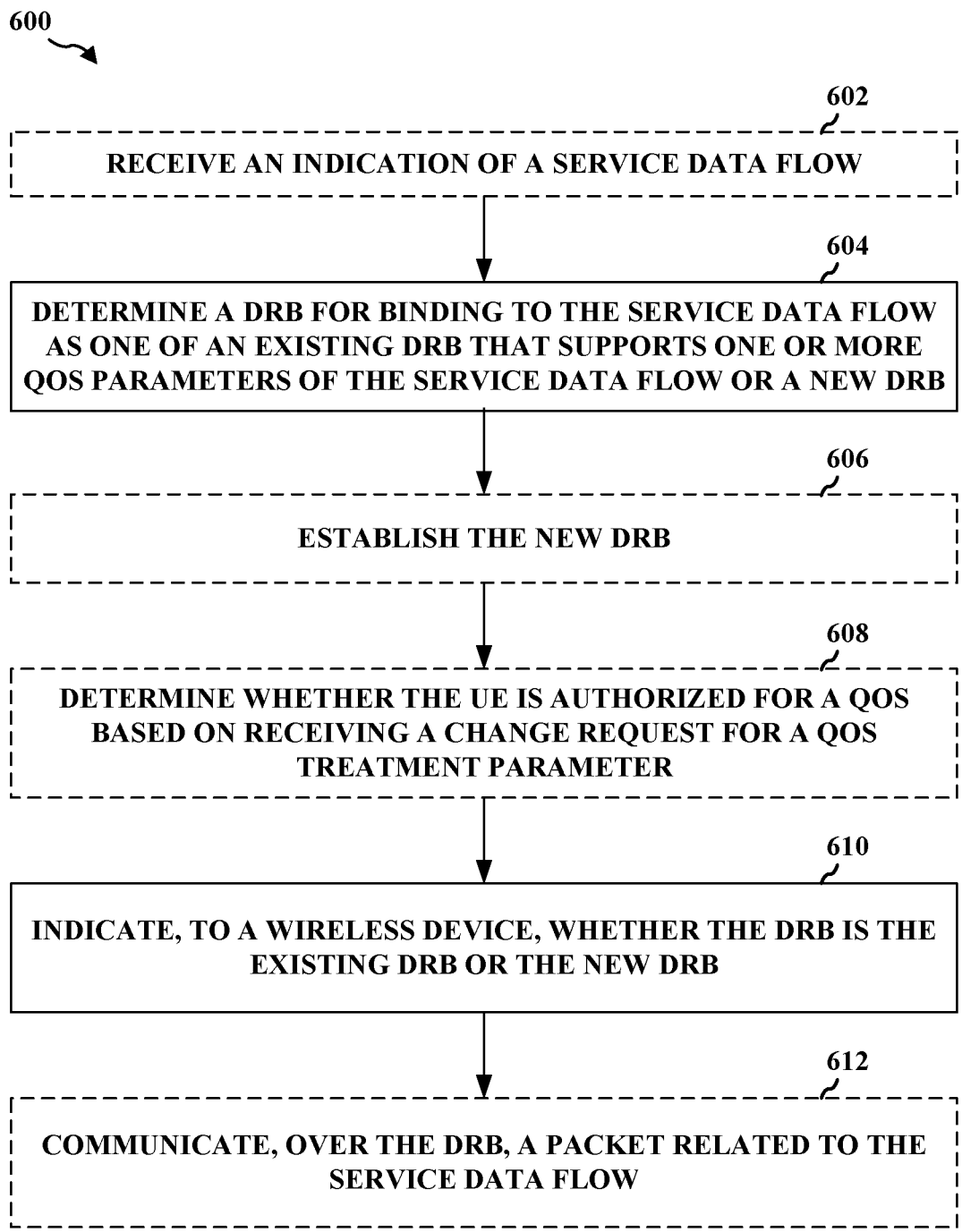
FIG. 6 illustrates an example of a method for indicating DRBs related to SDFs in accordance with aspects described herein.
Figure 7:
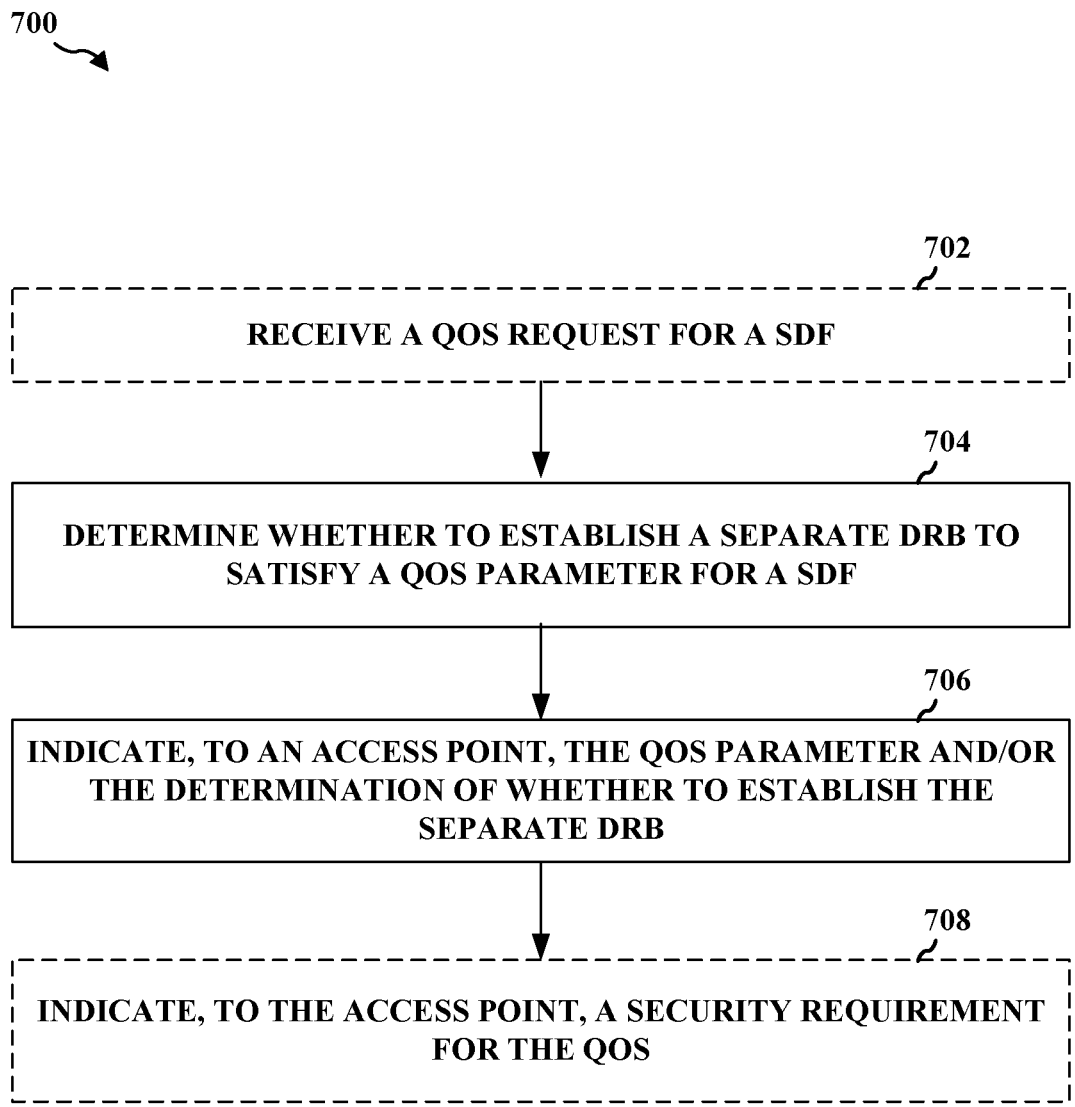
FIG. 7 illustrates an example of a method for establishing DRBs to provide a quality-of-service in accordance with aspects described herein.

Turning now to FIGS. 4A, 4B, 5-8, 9A, 9B, 10A, and 10B, aspects are depicted with reference to one or more components and one or more methods that may perform the actions or operations described herein, where aspects in dashed line may be optional. Although the operations described below in FIGS. 5-7 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

FIGS. 4A and 4B depict an example of a system 400 for managing DRBs in accordance with aspects described herein. System 400 includes a UE 415 that communicates with an access point 405 to access a wireless network, such as network component 401, examples of which are described in FIGS. 1-3 above (e.g., UEs 115, 206, 350, access points/eNBs 105, 204, 208, 310, etc., core network 130, etc.). In an aspect, access point 405 and UE 415 may have established one or more downlink channels over which downlink signals 406 can be transmitted by access point 405 (e.g., via access point transceiver 454) and received by UE 415 (e.g., via UE transceiver 404) for communicating control and/or data messages (e.g., signaling) from the access point 405 to the UE 415 over configured communication resources. Moreover, for example, access point 405 and UE 415 may have established one or more uplink channels over which uplink signals 408 can be transmitted by UE 415 (e.g., via UE transceiver 404) and received by access point 405 (e.g., via access point transceiver 454) for communicating control and/or data messages (e.g., signaling) from the UE 415 to the access point 405 over configured communication resources. For example, access point 405 and UE 415 may establish a bearer 480 over which the downlink signals 406 and/or uplink signals 408 may be communicated. In an example, as described further here, access point 405 and UE 415 may establish multiple bearers 480 for communicating, where each bearer 480 can correspond to a QoS, and may be bound to multiple SDFs.

In an aspect, UE 415 may include one or more processors 402 and/or a memory 403 that may be communicatively coupled, e.g., via one or more buses 407, and may operate in conjunction with or otherwise implement a communicating component 361 for communicating with one or more access points 405 over one or more DRBs bound to one or more SDFs. For example, the various operations related to the communicating component 361 may be implemented or otherwise executed by one or more processors 402 and, in an aspect, can be executed by a single processor, while in other aspects, different ones of the operations may be executed by a combination of two or more different processors. For example, in an aspect, the one or more processors 402 may include any one or any combination of a modem processor, or a baseband processor, or a digital signal processor, or an application specific integrated circuit (ASIC), or a transmit processor, or a transceiver processor associated with UE transceiver 404. Further, for example, the memory 403 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 402. Moreover, memory 403 or computer-readable storage medium may be resident in the one or more processors 402, external to the one or more processors 402, distributed across multiple entities including the one or more processors 402, etc.

In particular, the one or more processors 402 and/or memory 403 may execute actions or operations defined by communicating component 361 or its subcomponents. For instance, the one or more processors 402 and/or memory 403 may execute actions or operations defined by a DRB establishing component 410 for establishing one or more DRBs between UE 415 and access point 405. In an aspect, for example, DRB establishing component 410 may include hardware (e.g., one or more processor modules of the one or more processors 402) and/or computer-readable code or instructions stored in memory 403 and executable by at least one of the one or more processors 402 to perform the specially configured DRB establishing operations described herein. Further, for instance, the one or more processors 402 and/or memory 403 may execute actions or operations defined by a DRB binding component 412 for binding the one or more DRBs to one or more SDFs to facilitate providing a QoS for the SDF(s). In an aspect, for example, DRB binding component 412 may include hardware (e.g., one or more processor modules of the one or more processors 402) and/or computer-readable code or instructions stored in memory 403 and executable by at least one of the one or more processors 402 to perform the specially configured binding operations described herein.

Similarly, in an aspect, access point 405 may include one or more processors 452 and/or a memory 453 that may be communicatively coupled, e.g., via one or more buses 457, and may operate in conjunction with or otherwise implement a DRB managing component 302 for managing one or more DRBs for one or more UEs 415 to provide QoS for one or more SDFs. For example, the various functions related to DRB managing component 302 may be implemented or otherwise executed by one or more processors 452 and, in an aspect, can be executed by a single processor, while in other aspects, different ones of the functions may be executed by a combination of two or more different processors, as described above. In one example, the one or more processors 452 and/or memory 453 may be configured as described in examples above with respect to the one or more processors 402 and/or memory 403 of UE 415.

In an example, the one or more processors 452 and/or memory 453 may execute actions or operations defined by DRB managing component 302 or its subcomponents. For instance, the one or more processors 452 and/or memory 453 may execute actions or operations defined by a DRB establishing component 460 for establishing one or more DRBs with a UE. In an aspect, for example, DRB establishing component 460 may include hardware (e.g., one or more processor modules of the one or more processors 452) and/or computer-readable code or instructions stored in memory 453 and executable by at least one of the one or more processors 452 to perform the specially configured DRB establishing operations described herein. Further, for instance, the one or more processors 452 and/or memory 453 may execute actions or operations defined by a DRB binding component 462 for binding the one or more DRBs to one or more SDFs. In an aspect, for example, DRB binding component 462 may include hardware (e.g., one or more processor modules of the one or more processors 452) and/or computer-readable code or instructions stored in memory 453 and executable by at least one of the one or more processors 452 to perform the specially configured DRB binding operations described herein.

In an example, transceivers 404, 454 may be configured to transmit and receive wireless signals through one or more antennas 464, 466 and may generate or process the signals using one or more RF front end components (e.g., power amplifiers, low noise amplifiers, filters, analog-to-digital converters, digital-to-analog converters, etc.), one or more transmitters, one or more receivers, etc. In an aspect, transceivers 404, 454 may be tuned to operate at specified frequencies such that UE 415 and/or access point 405 can communicate at a certain frequency. In an aspect, the one or more processors 402, 452 may configure transceivers 404, 454 to operate at a specified frequency and power level based on a configuration, a communication protocol, etc.

In an aspect, transceivers 404, 454 can operate in multiple bands (e.g., using a multiband-multimode modem, not shown) such to process digital data sent and received using transceivers 404, 454. In an aspect, transceivers 404, 454 can be multiband and be configured to support multiple frequency bands for a specific communications protocol. In an aspect, transceivers 404, 454 can be configured to support multiple operating networks and communications protocols. Thus, for example, transceivers 404, 454 may enable transmission and/or reception of signals based on a specified modem configuration.

In addition, for example, network component 401 can be or can include one or more components of a core network, such as core network 130. For example, network component 401 can be or can include a mobility management entity (MME) for establishing SDFs with one or more UEs via one or more access points. As shown in FIG. 4B, network component 401 may include one or more processors 472 and/or a memory 473 that may be communicatively coupled, e.g., via one or more buses 477, and may operate in conjunction with or otherwise implement a flow managing component 481 for managing one or more SDFs for one or more UEs 415 to provide QoS for one or more SDFs. For example, the various functions related to flow managing component 481 may be implemented or otherwise executed by one or more processors 472 and, in an aspect, can be executed by a single processor, while in other aspects, different ones of the functions may be executed by a combination of two or more different processors, as described above. In one example, the one or more processors 472 and/or memory 473 may be configured as described in examples above with respect to the one or more processors 402 and/or memory 403 of UE 415.

In an example, the one or more processors 472 and/or memory 473 may execute actions or operations defined by flow managing component 481 or its subcomponents. For instance, the one or more processors 452 and/or memory 453 may execute actions or operations defined by a QoS component 482 for specifying one or more QoS parameters for a SDF. In an aspect, for example, QoS component 482 may include hardware (e.g., one or more processor modules of the one or more processors 452) and/or computer-readable code or instructions stored in memory 453 and executable by at least one of the one or more processors 452 to perform the specially configured QoS operations described herein. Further, for instance, the one or more processors 452 and/or memory 453 may optionally execute actions or operations defined by a DRB requesting component 484 for requesting establishing of a DRB for providing QoS for a SDF. In an aspect, for example, DRB requesting component 484 may include hardware (e.g., one or more processor modules of the one or more processors 452) and/or computer-readable code or instructions stored in memory 453 and executable by at least one of the one or more processors 452 to perform the specially configured DRB requesting operations described herein.

Network component 401 may also include a communications component 474 that may be coupled to one or more processors 472 and/or memory 473 via one or more buses 477. Communications component 474 may enable communication internally among components of network component 401, and/or may include one or more interfaces that enable communication with external devices, such as other components of the core network (e.g., one or more gateways, HSS, etc.), access point 405, etc. As such, communications component 474 can be configured to establish and maintain communications with one or more entities utilizing hardware, software, and/or services as described herein. In an aspect, for example with respect to external communications, communications component 474 may further include transmit chain components (e.g., protocol layer entities, processor(s), modulator(s), antenna) and receive chain components (e.g., protocol layer entities, processor(s), demodulator(s), antenna) associated with one or more transmitters and receivers, respectively, or one or more transceivers, operable for interfacing with external devices over a wired or wireless connection (similar to transceivers 404, 454). In one example, communications component 474 may include a network interface card that includes one or more wired or wireless interfaces for coupling to one or more networks (e.g., local area networks, wide area networks, etc.).

Figure 8:
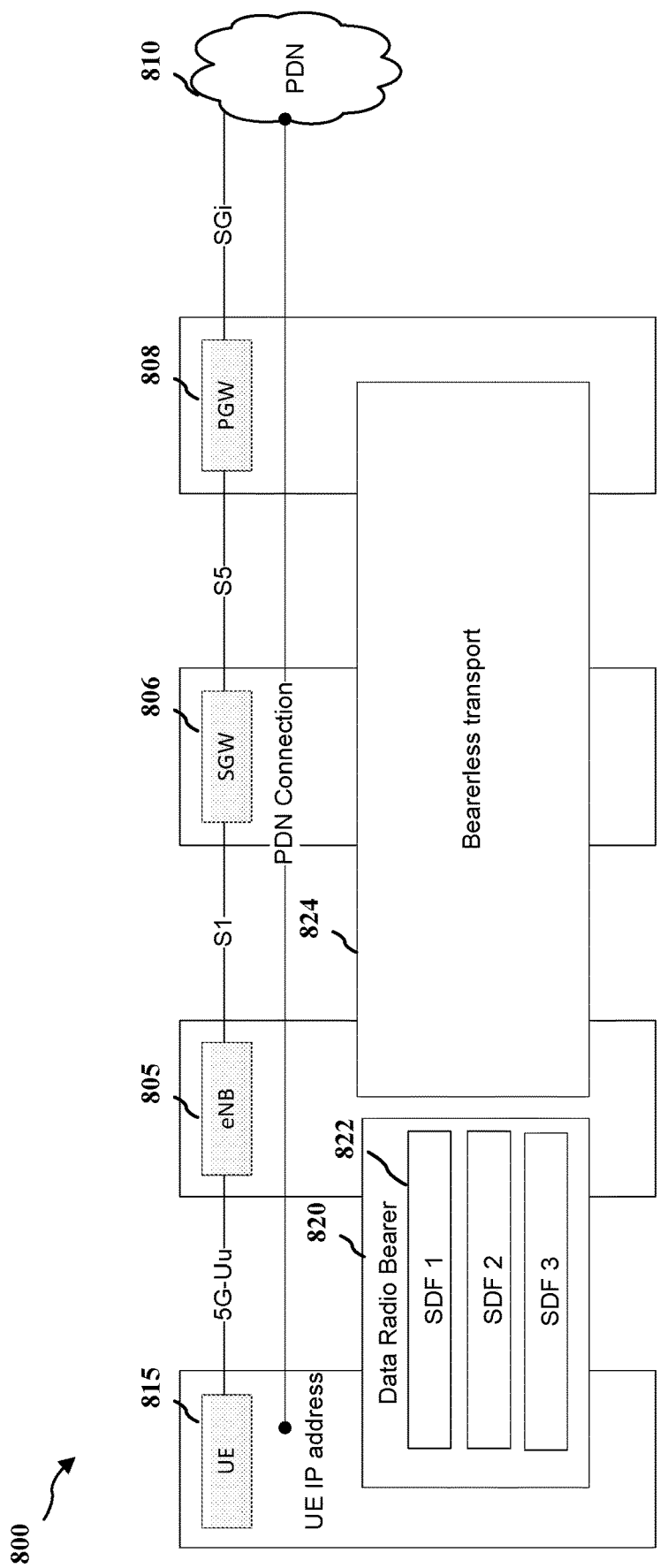
FIG. 8 illustrates an example of a system for establishing a DRB for handling multiple SDFs in accordance with aspects described herein.

As described, UE 415 can have one or more DRBs with access point 405 to manage one or more SDFs, where access point 405 has a single bearerless transport with the core network. An example is depicted in FIG. 8, which illustrates an example of a system 800 for wireless communication. FIG. 8 depicts a UE 815 that communicates with an eNB 805 to receive access to one or more core network components, which may include a serving gateway (SGW) 806, packet data network (PDN) gateway (PGW) 808, backend PDN 810, etc. UE 815 may establish one or more DRBs 820 with the eNB 805, where each DRB 820 may have one or more associated SDFs 822. SDFs 822 may be associated with DRBs 820 based on a QoS for the SDFs 822 (e.g., based on determining that the DRB 820 has one or more associated QoS treatment parameters that can support one or more QoS parameters of the SDF 822). eNB 805 has a bearerless transport 824 with the SGW 806/PGW 808 and/or other core network components. In this regard, eNB 805 can manage QoS for the SDFs 822 (e.g., based at least in part on establishing DRBs 820 that can provide QoS for the SDFs 822), as described further herein.

Referring to FIG. 5, an example of a method 500 is illustrated for communicating (e.g., by a UE) data related to one or more SDFs over one or more DRBs with an access point. In method 500, blocks indicated as dashed boxes can represent optional steps.

In an example, method 500 includes, at Block 502, receiving an indication of a binding between a SDF and a DRB. In an aspect, communicating component 361, e.g., in conjunction with processor(s) 402, memory 403, and/or UE transceiver 404, may receive the indication of the binding between the SDF and the DRB. For example, DRB establishing component 410 may establish one or more DRBs with the access point 405. In one example, DRB establishing component 410 may establish a DRB with the access point 405 as part of initiating communications therewith (e.g., based on performing a random access procedure therewith) to receive access to a network component 401. In another example, DRB establishing component 410 may establish one or more other DRBs with the access point 405 (e.g., to provide QoS for one or more SDFs), as described further herein. In an example, the indication of the binding between the SDF and the DRB may correspond to one or more of the DRBs established with the access point 405 and/or a new DRB for establishing with the access point 405. Moreover, for example, the indication can be received as part of establishing a new SDF and/or updating QoS parameters for an existing SDF. For example, the indication may include a parameter value in a message from the access point 405 that indicates the existence of the binding. In an example, the message may include an RRC message or other message from the access point 405. In addition, in an example, the indication may include a value in a TFT received from the access point 405.

Method 500 also includes, at Block 504, determining the DRB for binding to the SDF as either an existing DRB that supports one or more QoS parameters of the SDF, or a new DRB to support one or more QoS parameters of the SDF. In an aspect, DRB binding component 412, e.g., in conjunction with processor(s) 402, memory 403, and/or UE transceiver 404, may determine the DRB for binding to the SDF as one of an existing DRB that supports one or more QoS parameters of the SDF or a new DRB. In an example, DRB binding component 412 may determine this based on a binding or other information/indication (e.g., a TFT) received from the access point 405 that specifies the SDF to DRB binding. In an example, where a TFT is received from the access point 405, the TFT may include one or more of a source internet protocol (IP) address, a destination IP address, a UE identifier, a source port number, a destination port number, a source media access control (MAC) address, a destination MAC address, etc. Moreover, for example, the TFT can include an uplink TFT that binds SDFs to DRBs on the uplink at the UE 415, a downlink TFT that binds SDFs to DRBs on the downlink at the access point 405, etc. In an example, DRB binding component 412 can accordingly receive the TFT information and bind the associated SDF (e.g., the SDF associated with the source IP, destination IP, UE identifier, source port number, destination port number, etc.) to the DRB. For example, DRB binding component 412 can bind the SDF to the DRB by associating the SDF to the DRB such that communications associated with the SDF are communicated with the access point 405 over the DRB. For example, UE 415 can transmit communications associated with the SDF over the DRB based on the binding, and can receive communications associated with the SDF over the DRB.

Moreover, for example, communicating component 361 can receive at least one of an indication of quality-of-service (QoS) treatment parameters configured for the DRB, a data network session identifier, an identifier of the DRB from the access point 405, etc. In this example, communicating component 361 may classify the packet as related to the DRB based at least in part on at least one of the QoS treatment parameters configured for the DRB (e.g., based on determining whether the DRB can support QoS parameters of the SDF to which the packet relates) the data network session identifier (e.g., where the session identifier is associated with the DRB), or the identifier of the data radio bearer. In another example, DRB binding component 412 may determine the binding of a SDF to the DRB based on determining whether an existing DRB can support a QoS parameter of the SDF or whether a new DRB can be established to support the QoS parameter of the SDF.

Method 500 also includes, at Block 506, modifying an existing DRB or establishing the new DRB based on the determination. In an aspect, e.g., in conjunction with processor(s) 402, memory 403, and/or UE transceiver 404, DRB binding component 412 can modify an existing DRB or DRB establishing component 410 with access point 405 can establish the new DRB based on the determination. For example, where DRB binding component 412 determines the DRB as the existing DRB that supports a QoS parameter of the SDF, DRB binding component 412 can modify the DRB binding to associate the SDF along with other SDFs associated with the DRB. In another example, DRB binding component 412 can request update of the DRB to support the QoS parameter of the SDF.

In an example, modifying the existing DRB at Block 506 may optionally include, at Block 508, requesting a QoS parameter change for the SDF. For example, DRB binding component 412 can request the QoS parameter (e.g., for an existing DRB) be changed for the SDF. Thus, for example, DRB binding component 412 may request an increase in QoS for the SDF from access point 405, which may cause access point 405 to determine whether one or more existing DRBs can support the requested change in QoS parameter (e.g., whether a bit rate of the DRB, maximum and/or minimum delay of the DRB, a change in priority of the DRB, etc. can satisfy the updated QoS parameter), and accordingly update an existing DRB binding to include the SDF, establish a new DRB to handle the updated QoS parameter, reject the request, etc., as described further herein.

For example, DRB binding component 412 can request QoS parameter change for the SDF from access point 405 using access stratum (AS) signaling to the access point 405 (e.g., via radio resource control (RRC) message). In another example, DRB binding component 412 can request QoS parameter change for the SDF from network component 401 using non-AS (NAS) signaling via access point 405 to network component 401. In one example, DRB binding component 412 can request the QoS parameter change using AS signaling for existing SDFs and using NAS signaling for new SDFs.

In addition, for example, DRB binding component 412 can receive a response to the request for QoS parameter change from the access point 405, which may indicate success or failure of the parameter change, an indication to establish a new DRB to support the new QoS treatment parameter, etc. In one example, where DRB binding component 412 receives a success or acceptance of the QoS parameter change from access point 405, the response from the access point 405 may indicate establishment of the new DRB and/or mapping of the associated SDF to an existing DRB (e.g., where the new DRB parameters and/or existing DRB parameters may be indicated in the response). In another example, where DRB binding component 412 receives a failure of the parameter change from the access point 405 over AS signaling, DRB binding component 412 may then request the parameter change via NAS signaling (e.g., from network component 401). The selection of AS or NAS signaling may additionally be based on prior configuration or UE 415/access point 405 capability (e.g. advertised by access point 405), where the configuration may be related to the type of SDF, a data network session type, delay requirement, etc.

In another example, where DRB binding component 412 determines the DRB as a new DRB, DRB establishing component 410 can establish the new DRB with the access point 405, and can bind the new DRB to the SDF. In an example, DRB establishing component 410 can establish the new DRB as one of a UE-initiated establishment (e.g., based on determining to establish a new DRB for a SDF where existing DRBs may not support QoS parameters of the SDF) or in response to a request from access point 405 to establish the new DRB (e.g., where the access point 405 determines existing DRBs to not support the QoS parameters of the SDF), etc. In one example, DRB binding component 412 can receive a list of DRBs from the access point 405, where the list may indicate one or more DRBs and/or one or more flow identifiers (e.g., of one or more SDFs) to be associated with each of the one or more DRBs. The DRB binding component 412 can accordingly establish new DRBs, and/or modify existing DRBs (e.g., to associate or disassociate one or more SDFs with the existing DRBs) with the access point 405 based on the list of DRBs. In an example, the list of DRBs may also include other DRB-specific parameters, such as PDCP and/or RLC configuration information, a logical channel identifier or configuration, etc.

Method 500 may also include, at Block 510, transmitting, based on the binding, a packet using the DRB based at least in part on classifying the packet as related to the SDF. In an aspect, communicating component 361, e.g., in conjunction with processor(s) 402, memory 403, and/or UE transceiver 404, may transmit, based on the binding (e.g., and to the access point 405), the packet using the DRB based at least in part on classifying the packet as related to the SDF. For example, communicating component 361 can receive packets for communicating to the access point 405, where the packets correspond to a SDF (e.g., based on an application at the UE 415 that establishes the SDF with the network component 401. The packets may include one or more parameters related to the SDF, such as a source IP, destination IP, SDF or other flow/routing identifier, etc., and communicating component 361 classifies packets as associated with the SDF based on the one or more parameters. Accordingly, communicating component 361 can transmit a packet classified as relating to an SDF over an associated DRB.

Referring to FIG. 6, an example of a method 600 is illustrated for managing (e.g., by an eNB) one or more DRBs to provide QoS for one or more SDFs. In method 600, blocks indicated as dashed boxes can represent optional steps.

In an example, method 600 optionally includes, at Block 602, receiving an indication of a SDF. In an aspect, DRB managing component 302, e.g., in conjunction with processor(s) 452, memory 453, and/or access point transceiver 454, may receive the indication of the SDF. For example, DRB managing component 302 can receive the indication of the SDF from the network component 401. In this example, UE 415 can establish the SDF with network component 401 via access point 405, and DRB managing component 302 can receive the indication of the SDF as part of the establishment. The indication, for example, may include a SDF description that indicates one or more parameters regarding the SDF, such as the one or more QoS parameters, an identifier or label of the SDF, etc. In another example, DRB managing component 302 can receive the indication of the SDF from the UE 415 as part of a request for QoS treatment parameter modification, as described further herein.

Method 600 includes, at Block 604, determining a DRB for binding to the SDF as one of an existing DRB that supports one or more QoS parameters of the SDF or a new DRB that supports one or more QoS parameters of the SDF if no existing DRB does. In an aspect, DRB binding component 462, e.g., in conjunction with processor(s) 452, memory 453, and/or access point transceiver 454, can determine the DRB for binding to the SDF as one of the existing DRB that supports one or more QoS parameters of the SDF or the new DRB. For example, DRB binding component 462 may receive one or more QoS parameters regarding the SDF, such as a desired QoS for the SDF, which can be indicated by the network component 401 to access point 405 in establishing the SDF, from the UE 415 based on establishing the SDF, etc. For example, DRB binding component 462 can determine whether one or more DRBs between access point 405 and UE 415 can support the QoS parameter of the SDF.

In one example, each of the one or more DRBs can have associated QoS treatment parameters, and DRB binding component 462 can determine whether the QoS treatment parameters (e.g., one or more of a bit rate, delay, priority, etc.) can support the QoS for the SDF. For example, DRB binding component 462 can determine whether the QoS treatment parameters of the DRB are sufficient to satisfy a QoS parameter of the SDF (e.g., a desired or required QoS for a related service). The QoS treatment parameters of the DRB may include a configuration of the DRB, a current load of the RAN (e.g., a number of UEs communicating with the RAN, a number or capacity of resources of the RAN that are being utilized by UEs, etc.), a channel condition of the UE 415 (e.g., received signal strength indicator (RSSI), reference signal received power (RSRP), reference signal received quality (RSRQ), signal-to-noise ratio (SNR), interference over thermal (IoT), etc.), available resources in transmission and reception points of the RAN, etc. If the QoS treatment parameters of one or more of the existing DRBs are sufficient to satisfy the QoS parameter of the SDF, DRB binding component 462 can bind the SDF to the corresponding DRB for communicating data of the SDF over the DRB. If DRB binding component 462 determines that no existing DRBs can support the QoS parameter of the SDF, in an example, DRB establishing component 460 can establish a new DRB with the UE 415.

For example, method 600 may optionally include, at Block 606, establishing the new DRB. In an aspect, DRB establishing component 460, e.g., in conjunction with processor(s) 452, memory 453, and/or access point transceiver 454, can establish the new DRB (e.g., with UE 415) where the DRB binding component 462 determines to establish the new DRB, and DRB binding component 462 can accordingly determine the binding between the SDF and the new DRB. For example, DRB binding component 462 can establish the new DRB with the UE 415 using RRC signaling to establish the new DRB. In addition, for example, DRB binding component 462 can establish the new DRB with the UE 415 with parameters (e.g., a certain bit rate or other throughput parameter, etc.) for achieving a corresponding QoS. As described, the access point 405 can manage communications from the new DRB and existing DRBs over a connection with the network component 401, which may be a single bearerless connection per UE, a single connection for multiple UEs, etc.

Method 600 may also optionally include, at Block 608, determining whether the UE is authorized for a QoS based on receiving a change request for a QoS treatment parameter. In an aspect, DRB binding component 462, e.g., in conjunction with processor(s) 452, memory 453, and/or access point transceiver 454, can determine whether the UE is authorized for a QoS based on receiving a change request for a QoS treatment parameter. In one example, DRB binding component 462 can receive the change request based on establishing the SDF as a new flow (e.g., based on receiving the indication of the SDF). For example, DRB binding component 462 can receive (e.g., from the network component 401 or UE 415) a label, flow identifier, QoS parameter, etc. for the SDF indicating a type SDF, from which DRB binding component 462 can determine one or more QoS treatment parameters that correspond to the label, flow identifier, QoS parameter, etc. (e.g., based on a configuration at the access point 405).

In another example, DRB binding component 462 can receive the request from UE 415 (e.g., via RRC message). As described, in an example, UE 415 may request change in a QoS treatment parameter for a DRB (e.g., to support a SDF QoS parameter). In this example, DRB binding component 462 can determine whether the UE is authorized for a QoS based on changing the QoS treatment parameter. For example, DRB binding component 462 can determine whether the UE is authorized based on locally stored subscription information for the UE 415, subscription information received from the network component 401 for the UE 415 (e.g., based on subscription information regarding the UE 415 as maintained or obtained by the network component 401 or another network component, which may include an HSS), etc. In an example, DRB binding component 462 can request upgrade approval for the QoS from network component 401 for UE 415 (e.g., where additional information regarding the SDF is desired and/or where access point 405 cannot permit the upgrade in QoS without authorization from the network component 401, such as where the UE 415 can be limited to certain QoS based on subscription). Based on the response from network component 401 or otherwise, DRB binding component 462 may indicate the SDF as bound to the existing DRB with the QoS treatment parameter updated and/or may indicate the SDF as bound to one or more new DRBs that may achieve the QoS based on the QoS treatment parameter.

Method 600 also includes, at Block 610, indicating, to a wireless device, whether the DRB is the existing DRB or the new DRB. In an aspect, DRB managing component 302, e.g., in conjunction with processor(s) 452, memory 453, and/or access point transceiver 454, can indicate, to the wireless device (e.g., UE 415), whether the DRB is the existing DRB or the new DRB. For example, DRB managing component 302 can indicate whether the DRB is the existing DRB or a new DRB via RRC message to the UE 415 (e.g., by setting a parameter value in the RRC message as the indication). For example, DRB managing component 302 can indicate whether the DRB is the existing DRB or a new DRB based on at least one of determining the DRB as the existing DRB that supports the one or more QoS parameters of the SDF or a new data DRB, determining whether the UE is authorized for the QoS based on the change request, etc.

Moreover, for example, DRB managing component 302 can transmit DRB to SDF binding information to the UE 415, which may include a TFT, or a list thereof, data network session identifiers, etc. associated with the DRB, an identifier of the DRB, etc. For example, the indication can additionally include one or more of the PDCP and/or RLC configuration information for the DRB, a priority, delay requirement or threshold, scheduling policy, etc. for the DRB. Moreover, in an example, DRB managing component 302 can indicate whether the QoS parameter of the SDF can be satisfied by the DRB.

Method 600 also optionally includes, at Block 612, communicating, over the DRB, a packet related to the SDF. In an aspect, DRB managing component 302, e.g., in conjunction with processor(s) 452, memory 453, and/or access point transceiver 454, can communicate, over the DRB, a packet related to the SDF. For example, DRB managing component 302 can manage packet forwarding for packets between UE 415 and network component 401 related to the one or more SDFs based on QoS treatment parameters (e.g., PDCP/RLC configuration, scheduling policy, queue management policy, rate shaping policy, delay, throughput, priority, etc.) defined for the associated one or more DRBs.

Referring to FIG. 7, an example of a method 700 is illustrated for managing (e.g., by one or more network components of a core network) a SDF with a UE. In method 700, blocks indicated as dashed boxes can represent optional steps.

In an example, method 700 optionally includes, at Block 702, receiving a QoS request for a SDF. In an aspect, QoS component 482, e.g., in conjunction with processor(s) 472, memory 473, and/or communications component 474, may receive the QoS request for the SDF. As described, in an example, access point 405 may request a QoS for a SDF, which may be based on a request from UE 415 to modify the QoS. In an example, this may include UE 415 requesting a QoS change via a NAS request, as described, interacting with a control plane function in the core network (e.g., via access point 405) to have a new IP address allocated, network component 401 detecting a flow for one of an existing IP address allocated to the UE 415, and/or the like. For example, the request may include one or more parameters related to the QoS of the SDF, such as a desired QoS for the SDF, a flow descriptor or label of the SDF, a description of the QoS parameter, etc. to allow for identifying the associated QoS for the SDF. In an example, communication between the network component 401 control plane function and the access point 405 may be a communication between the control plane function performing session management to the access point 405 via the control plane function performing mobility management function.

Method 700 includes, at Block 704, determining whether to establish a separate DRB to satisfy a QoS parameter for a SDF. In an aspect, DRB requesting component 484, e.g., in conjunction with processor(s) 472, memory 473, and/or communications component 474, may determine whether to establish the separate DRB to satisfy the QoS parameter for the SDF. In one example, DRB requesting component 484 may determine whether to establish the separate DRB based at least in part on determining whether one or more existing DRBs between access point 405 and UE 415 can satisfy a QoS of the SDF (e.g., based on comparing one or more QoS treatment parameters indicated for the existing DRBs to a QoS parameter of the SDF, receiving an indication from the access point 405 and/or UE 415 that the DRB cannot support a QoS parameter of the SDF, etc.).

Method 700 may also include, at Block 706, indicating, to an access point, the QoS parameter and/or the determination of whether to establish the separate DRB. In an aspect, QoS component 482, e.g., in conjunction with processor(s) 472, memory 473, and/or communications component 474, may indicate, to the access point (e.g., access point 405, the QoS parameter and/or the determination of whether to establish the separate DRB. Thus, the access point 405 may determine a DRB for binding to the SDF, as described, based on determining a DRB that has QoS treatment parameters that can satisfy a QoS parameter of the SDF. In another example, the access point 405 may establish a new DRB based on the determination indicated from the network component 401 that an existing DRB cannot satisfy an QoS parameter of the SDF, and then binds the new DRB to the SDF, as described.

Method 700 may also optionally include, at Block 708, indicating, to the access point, a security requirement for the QoS. In an aspect, QoS component 482, e.g., in conjunction with processor(s) 472, memory 473, and/or communications component 474, may indicate, to the access point (e.g., access point 405), a security requirement for the QoS. For example, the security requirement may include a network session security requirement, a flow security requirement, etc. As described, for example, authentication of the UE 415 may be used as part of a change request for QoS of a flow. Thus, QoS component 482 may indicate the requirement for security, whether network session based, flow based, etc., to the access point 405 in this example. In another example, the indicted security requirement may include a secured token for the flow to simplify QoS classification. In this example, access point 405 can obtain the secured token, and can associate the secured token to the flow for providing with packets related to the flow. For example, the secured token may indicate that the UE 415 associated with the flow is authorized for the associated QoS.

Figure 9A:
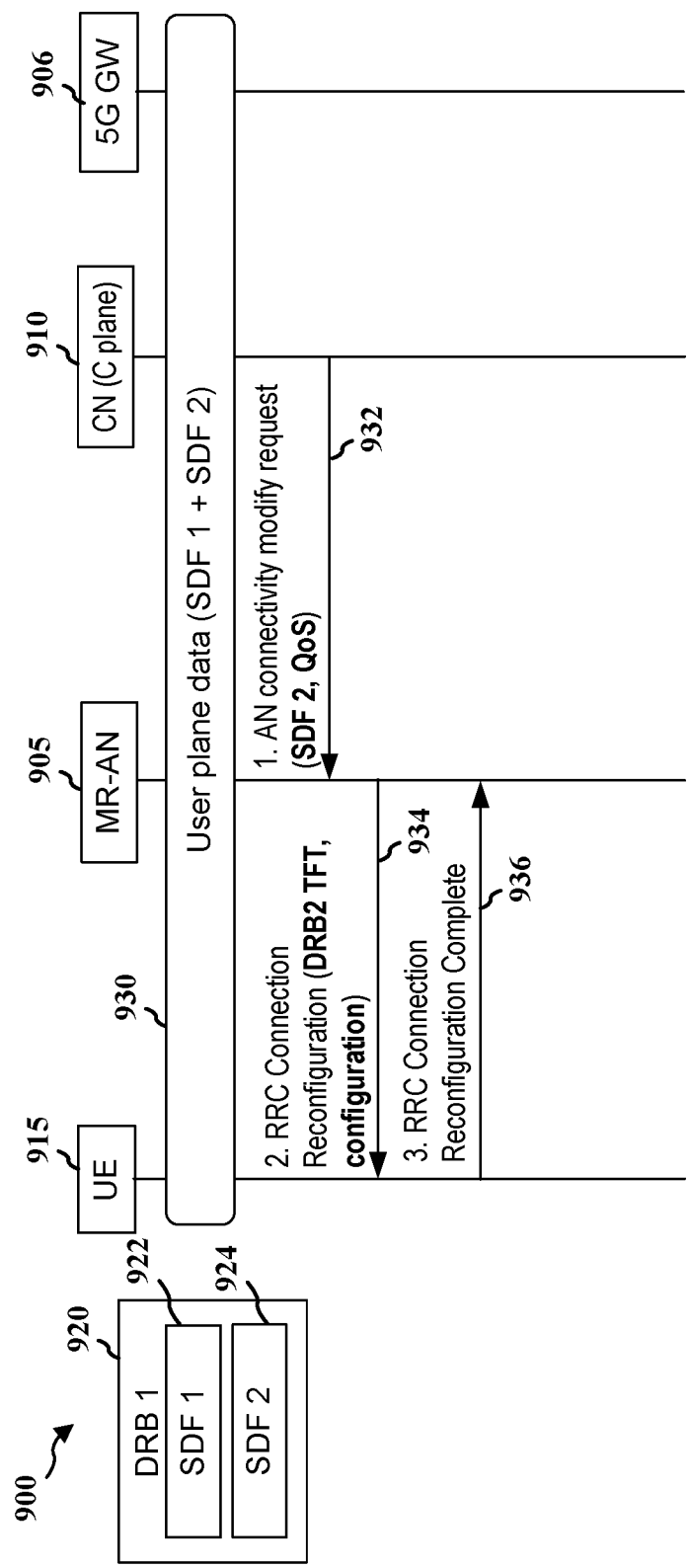
FIG. 9A illustrates an example of a system for configuring a DRB for handling one or more SDFs in accordance with aspects described herein.
Figure 9B:
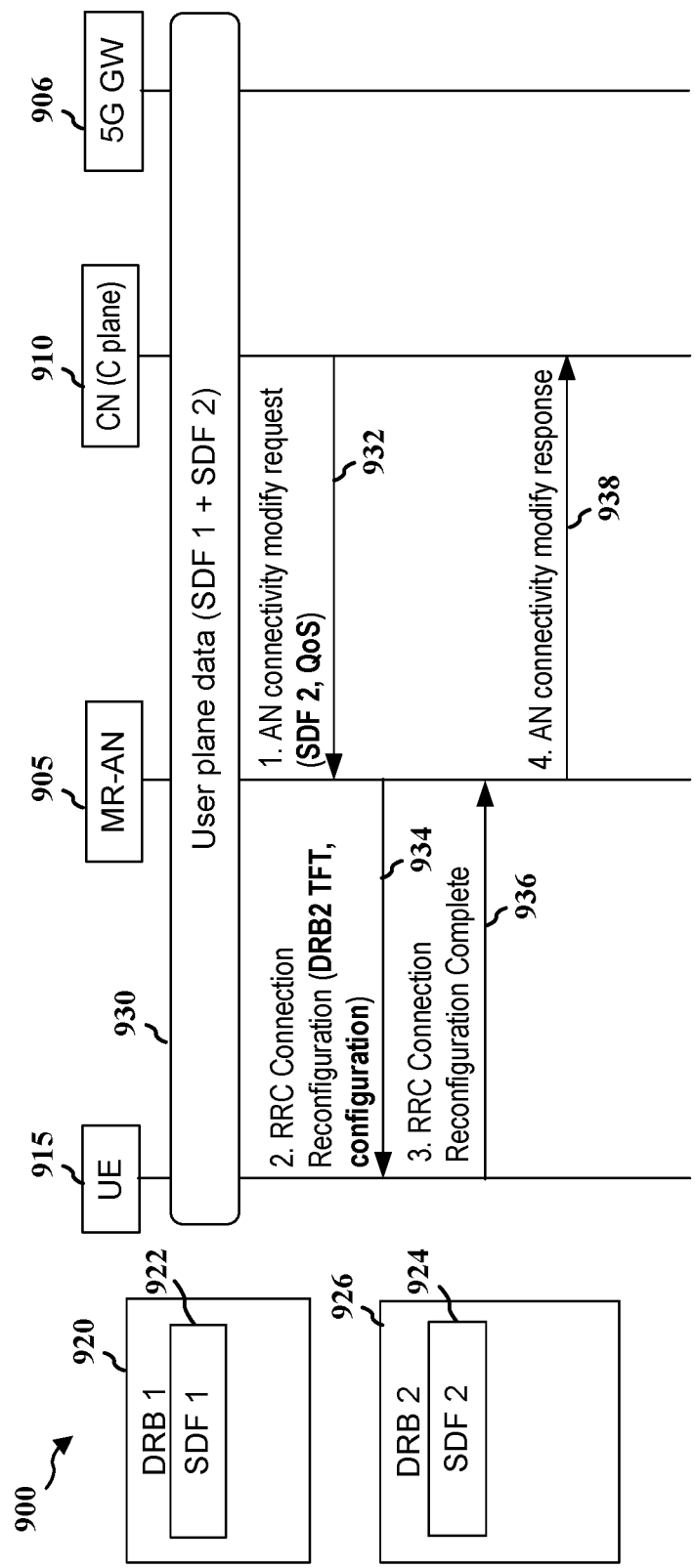
FIG. 9B illustrates an example of a system for establishing multiple DRBs for handling multiple SDFs in accordance with aspects described herein.

FIGS. 9A-9B illustrate an example of a system 900 for establishing DRBs for managing QoS of SDFs. FIG. 9A depicts a UE 915 that communicates with a RAN 905, which may include an eNB, to receive access to a core network (CN) 910 control plane and/or one or more related network components. In an example, CN 910 can be or can include network component 401. System 900 also includes a GW 906. UE 915 may establish one or more DRBs 920 with the RAN 905, where each DRB 920 may have one or more associated SDFs. DRB 1 920 may be a best efforts DRB (e.g., a non-guaranteed bit rate DRB) that includes SDF 1 922 and SDF 2 924. At 930, UE 915 can communicate user plane data over SDF 1 922 and SDF 2 924 (e.g., over DRB 920). In this example, QoS binding is triggered by a change in a QoS parameter of the SDF 2 924, where CN 910 communicates an access network (AN) connectivity modify request 932 to RAN 905 (e.g., via flow managing component 481 or related components), which identifies SDF 2 924 and an associated QoS parameter to be updated. As described, for example, the change in QoS parameter may be initiated by the CN 910, based on a request from UE 915, etc. RAN 905 (e.g., via DRB managing component 302 or related components) can receive the request 932 and determine to establish a new DRB to support the new QoS parameter for SDF 2 924 (e.g., based on determining that DRB 1 920 and/or other DRBs cannot support the QoS). Accordingly, RAN 905 (e.g., via DRB managing component 302 or related components) can transmit a RRC connection reconfiguration 934 to UE 915 to add a DRB 2, along with a TFT configuration to bind SDF 2 924 to DRB 2 926. In a specific example, the TFT configuration may include a list of SDF identifiers to be bound to the corresponding DRB. The UE 915 can transmit an RRC connection reconfiguration component 936 to indicate that the binding is complete.

FIG. 9B depicts establishment of DRB 2 926 between UE 915 and RAN 905 in this regard. UE 915 can establish (e.g., via communicating component 361 or related components) DRB 2 926 with RAN 905, which may be based on parameters received in the RRC connection reconfiguration 934 (e.g., RLC configuration, priority, etc. for the DRB 2 926). UE 915 can additionally (e.g., via communicating component 361 or related components) update binding of the SDF 2 924 to bind to DRB 2 926 instead of DRB 1 920 (and/or any indicated update in binding for DRB 1 920) based on the received TFT configuration. For example, DRB 2 926 can be established as a guaranteed bit rate (GBR) DRB to support the QoS updated for SDF 2 924. UE can transmit a RRC connection reconfiguration complete 936 to RAN 905 indicating establishment of the new DRB 2 926 and/or updating of the binding of SDF 2 924. RAN 905 can transmit a AN connectivity modify response 938 to CN 910. Accordingly, UE 915 and CN 910 can communicate data for SDF 2 924, where UE 915 uses DRB 2 926 with RAN 905 to communicate over SDF 2 924.

Though shown as accepting the request 932, RAN 905 may reject the request 932 based on determining that the updated QoS of the SDF 2 924 cannot be fulfilled by the RAN 905. In an example, RAN 905 can transmit a rejection message that includes a rejection code, and can refrain from modifying the DRB configuration.

Figure 10A:
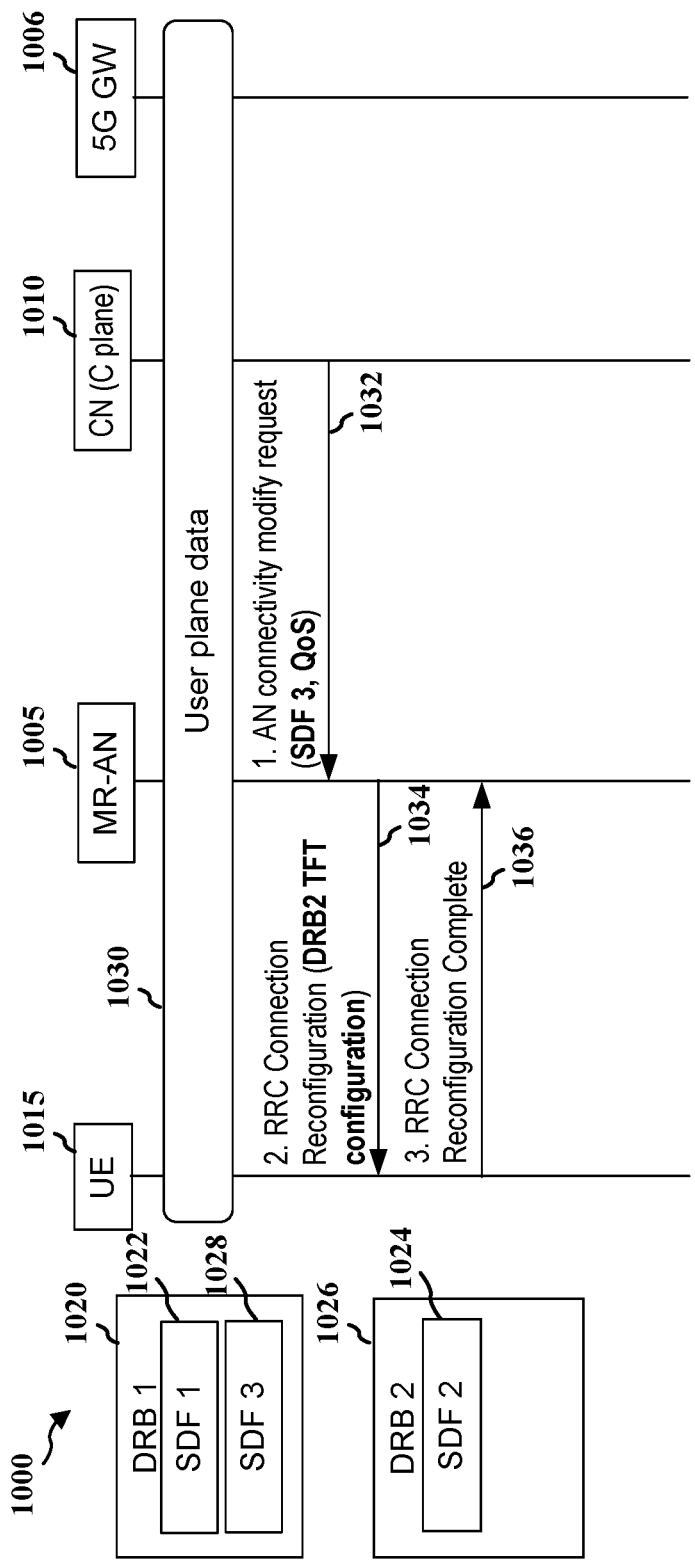
FIG. 10A illustrates an example of a system for establishing multiple DRBs for handling one or more SDFs in accordance with aspects described herein.
Figure 10B:
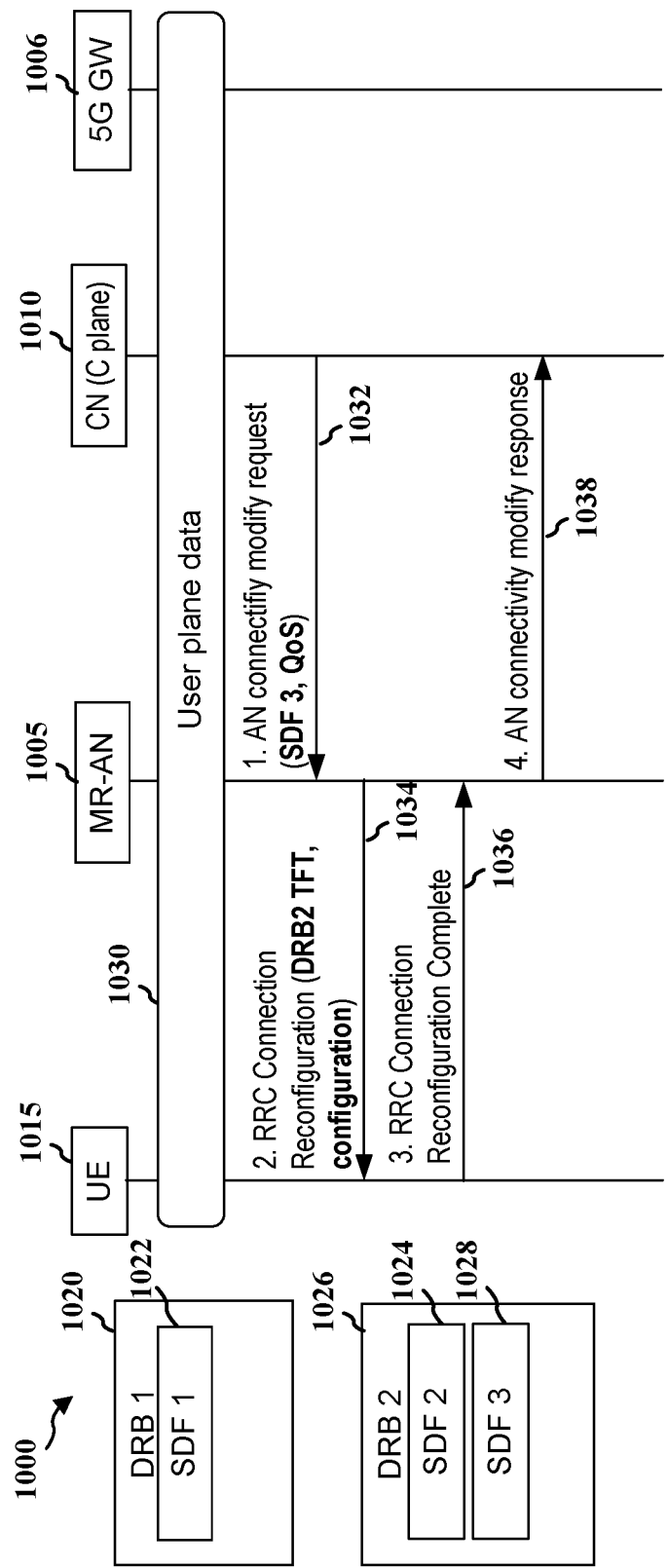
FIG. 10B illustrates an example of a system for reconfiguring an SDF to a different DRB in accordance with aspects described herein.

FIGS. 10A-10B illustrate an example of a system 1000 for modifying DRBs for managing QoS of SDFs. FIG. 10A depicts a UE 1015 that communicates with a RAN 1005, which may include an eNB, to receive access to a CN 1010 control plane and/or one or more related network components. For example, CN 1010 may be or may include network component 401. System 1000 also includes a GW 1006. UE 1015 may establish one or more DRBs 1020, 1026 with the RAN 1005, where each DRB 1020, 1024 may have one or more associated SDFs. DRB 1 1020 may be a best efforts DRB (e.g., a non-GBR DRB) that includes SDF 1 1022 and SDF 3 1028, and DRB 2 1026 can be a GBR bearer that includes SDF 2 1024.

At 1030, UE 1015 can communicate user plane data over SDF 1 1022, SDF 2 1024, and/or SDF 3 1028 (e.g., over DRB 1 1020 and/or DRB 2 1026). In this example, QoS modification is triggered by a change in a QoS parameter of the SDF 3 1028, where CN 1010 communicates an access network (AN) connectivity modify request 1032 to RAN 1005 (e.g., via flow managing component 481 or related components), which identifies SDF 3 1028 and an associated QoS parameter to be updated. As described, for example, the change in QoS parameter may be initiated by the CN 1010, based on a request from UE 1015, etc. RAN 1005 (e.g., via DRB managing component 302 or related components) can receive the request 1032 and determine to modify a binding of SDF 3 1028 to DRB 2 1026 instead of DRB 1 1020 (e.g., to support the new QoS parameter. For example, RAN 1005 may determine that DRB 1 1020 cannot support the QoS parameter for SDF 3 1028. Accordingly, RAN 1005 (e.g., via DRB managing component 302 or related components) can transmit a RRC connection reconfiguration 1034 to UE 1015 to modify DRB 2 1026, along with a TFT configuration to bind SDF 3 1028 to DRB 2 1026. In a specific example, the TFT configuration may include a list of SDF identifiers to be bound to the corresponding DRB. The UE 1015 can transmit an RRC connection reconfiguration component 1036 to indicate that the binding is complete.

FIG. 10B depicts binding of the SDF 2 1024 to bind to DRB 2 1026 instead of DRB 1 1020 (and/or any indicated update in binding for DRB 1 1020) based on the received TFT configuration. UE can transmit a RRC connection reconfiguration complete 1036 to RAN 1005 indicating updating of the binding of SDF 3 1028. RAN 1005 can transmit a AN connectivity modify response 1038 to CN 1010. Accordingly, UE 1015 and CN 1010 can communicate data for SDF 3 1028, where UE 1015 uses DRB 2 1026 with RAN 1005 to communicate over SDF 3 1028.

Though shown as accepting the request 1032, RAN 1005 may reject the request 1032 based on determining that the updated QoS of the SDF 3 1028 cannot be fulfilled by the RAN 1005. In an example, RAN 1005 can transmit a rejection message that includes a rejection code, and can refrain from modifying the DRB configuration.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for communicating in a wireless network, comprising:
   receiving, by a user equipment (UE) and from an access point, a radio resource control (RRC) reconfiguration message indicating a binding between a service data flow and a data radio bearer associated with the access point;
   determining, by the UE, whether the data radio bearer indicated in the RRC reconfiguration message is an existing data radio bearer that supports one or more quality-of-service (QoS) parameters of the service data flow or a new data radio bearer to support one or more data flows of the service data flow;
   if the data radio bearer is the existing data radio bearer, determining, from the RRC reconfiguration message, a flow identifier of the service data flow to be added to the existing data radio bearer, and modifying the existing data radio bearer to additionally bind to the service data flow associated with the determined flow identifier;
   if the data radio bearer is the new data radio bearer, determining, from the RRC reconfiguration message, a flow identifier of the service data flow to be bound to the new data radio bearer, establishing, by the UE, the new data radio bearer, and binding the service data flow associated with the determined flow identifier to the new data radio bearer; and
   transmitting, by the UE, to the access point, and based on the binding indicated in the RRC message, a packet using the data radio bearer based at least in part on classifying the packet as related to the service data flow.

2. The method of claim 1, wherein the data radio bearer is a guaranteed bit rate data radio bearer.

3. The method of claim 1, wherein the binding indicated in the RRC message relates to a traffic flow template received from the access point.

4. The method of claim 3, wherein the traffic flow template comprises one or more of a source internet protocol (IP) address, a destination IP address, a user equipment (UE) identifier, a source port number, a destination port number, a source media access control (MAC) address, or a destination MAC address.

5. The method of claim 1, further comprising receiving at least one of an indication of one or more QoS treatment parameters configured for the data radio bearer, a data network session identifier, or an identifier of the data radio bearer from the access point, wherein classifying the packet as related to the data radio bearer is based at least in part on at least one of the one or more QoS treatment parameters, the data network session identifier, or the identifier of the data radio bearer.

6. The method of claim 1, further comprising requesting a change in the one or more QoS parameters of the service data flow.

7. The method of claim 6, wherein requesting the change comprises requesting the change using non-access stratum (NAS) signaling or access stratum (AS) signaling.

8. The method of claim 7, wherein requesting the change using NAS signaling or AS signaling is based at least in part on at least one of a type of the service data flow, a network session type, or a delay requirement of the service data flow.

9. The method of claim 7, further comprising determining to use NAS signaling to request the change in the one or more QoS parameters where the service data flow corresponds to a new data network.

10. The method of claim 7, further comprising determining to use AS signaling to request the change in the one or more QoS parameters where the service data flow corresponds to an existing data network.

11. The method of claim 7, further comprising determining to use NAS signaling to request the change in the one or more QoS parameters where a prior request using AS signaling is rejected.

12. The method of claim 7, further comprising receiving, from the access point, a response to the requesting the change, wherein the modifying the existing data radio bearer or the establishing the new data radio bearer is based on the response.

13. A method for communicating in a wireless network, comprising:
- determining a data radio bearer for binding to a service data flow as one of an existing data radio bearer that supports one or more quality-of-service (QoS) parameters of the service data flow or a new data radio bearer;
- transmitting, from an access point to a wireless device, an indication of the binding of the radio data bearer for binding to the service data flow, indicating whether the data radio bearer is the existing data radio bearer or the new data radio bearer, wherein the indication of the binding comprises a radio resource control (RRC) reconfiguration message from the access point, the RRC reconfiguration message indicating a flow identifier of the service data flow to be associated with the data radio bearer,
- wherein if the wireless device uses the indication to determine that the data radio bearer is the existing data radio bearer, the wireless device determines, from the RRC reconfiguration message, the flow identifier of the service data flow to be added to the existing data radio bearer, and modifies the existing data radio bearer to additionally bind to the service data flow associated with the determined flow identifier, and
- wherein if the wireless device uses the indication to determine that the data radio bearer is the new data radio bearer, the wireless device determines, from the RRC reconfiguration message, the flow identifier of the service data flow to be bound to the new data radio bearer, establishes the new data radio bearer, and binds the service data flow associated with the determined flow identifier to the new data radio bearer; and
- communicating, with the wireless device and over the data radio bearer, a packet related to the service data flow.

14. The method of claim 13, wherein determining that the existing data radio bearer supports the one or more QoS parameters comprises determining that one or more QoS treatment parameters of the existing data radio bearer supports the one or more QoS parameters of the service data flow.

15. The method of claim 13, wherein determining the data radio bearer as one of the existing data radio bearer or the new data radio bearer is further based at least in part on a configuration of the existing data radio bearer, a current load of a radio access network, a channel condition of the wireless device, or resources available in transmission and/or reception points managed by the radio access network.

16. The method of claim 13, wherein the indication comprises a list of traffic flow templates and data network session identifiers associated with the data radio bearer and/or an identifier of the data radio bearer.

17. The method of claim 13, wherein the transmitting the indication comprises transmitting, to the wireless device, at least one of a radio link control (RLC) configuration, a packet data convergence protocol (PDCP) configuration, a priority, a delay budget, a throughput budget, a minimum throughput requirement, or a scheduling policy of the data radio bearer.

18. The method of claim 13, wherein the determining the data radio bearer includes determining the data radio bearer as the new data radio bearer based at least in part on determining that one or more existing data radio bearers cannot support the one or more QoS parameters of the service data flow.

19. The method of claim 18, wherein establishing the new data radio bearer is established based at least in part on a label received from a gateway or the wireless device.

20. The method of claim 13, further comprising receiving an indication of the service data flow, wherein determining the data radio bearer is based at least in part on receiving the indication of the service data flow.

21. The method of claim 20, wherein the indication of the service data flow includes at least one of a flow identifier for the service data flow or a traffic flow template (TFT) of the service data flow from a core network.

22. The method of claim 13, further comprising
- receiving a change request for the one or more QoS parameters of the service data flow from the wireless device;
- determining whether to update the one or more QoS parameters based on the change request; and
- indicating the determination to the wireless device.

23. The method of claim 22, wherein determining whether to update the one or more QoS parameters comprises determining whether the wireless device is authorized for a change in the one or more QoS parameters based on the change request.

24. The method of claim 23, wherein the determining whether the wireless device is authorized is based on a subscription of the wireless device.

25. The method of claim 23, wherein the determining whether the wireless device is authorized comprises requesting changing of the one or more QoS parameters for the service data flow from a core network.

26. An apparatus for wireless communications, comprising:
- a transceiver for communicating one or more wireless signals via one or more antennas;
- a memory configured to store instructions; and
- one or more processors communicatively coupled with the transceiver and the memory, wherein the one or more processors are configured to:
  - receive, from an access point, a radio resource control (RRC) reconfiguration message indicating a binding between a service data flow and a data radio bearer associated with the access point;
  - determine whether the data radio bearer indicated in the RRC reconfiguration message is an existing data radio bearer that supports one or more quality-of-service (QoS) parameters of the service data flow or a new data radio bearer to support one or more data flows of the service data flow;
  - determining, from the RRC reconfiguration message, a flow identifier of the service data flow to be bound to the new data radio bearer, establishing the new data radio bearer, and binding the service data flow associated with the determined flow identifier to the new data radio bearer; and
  - transmit, to the access point and based on the binding indicated in the RRC message, a packet using the data radio bearer based at least in part on classifying the packet as related to the service data flow.

27. The apparatus of claim 26, wherein the data radio bearer is a guaranteed bit rate data radio bearer.

28. An apparatus for wireless communications, comprising:
- a transceiver for communicating one or more wireless signals via one or more antennas;
- a memory configured to store instructions; and one or more processors communicatively coupled with the transceiver and the memory, wherein the one or more processors are configured to:

determine a data radio bearer for binding to a service data flow as one of an existing data radio bearer that supports one or more quality-of-service (QoS) parameters of the service data flow or a new data radio bearer;

transmit, by the apparatus to a wireless device, an indication of the binding of the radio data bearer for binding to the service data flow, indicating whether the data radio bearer is the existing data radio bearer or the new data radio bearer, wherein the indication of the binding comprises a radio resource control (RRC) reconfiguration message from the apparatus, the RRC reconfiguration message indicating a flow identifier of the service data flow to be associated with the data radio bearer, wherein if the wireless device uses the indication to determine that the data radio bearer is the existing data radio bearer, the wireless device determines, from the RRC reconfiguration message, the flow identifier of the service data flow to be added to the existing data radio bearer, and modifies the existing data radio bearer to additionally bind to the service data flow associated with the determined flow identifier, and wherein if the wireless device uses the indication to determine that the data radio bearer is the new data radio bearer, the wireless device determines, from the RRC reconfiguration message, the flow identifier of the service data flow to be bound to the new data radio bearer, establishes the new data radio bearer, and binds the service data flow associated with the determined flow identifier to the new data radio bearer; and and communicate, with the wireless device and over the data radio bearer, a packet related to the service data flow.

29. The apparatus of claim 26, wherein the binding indicated in the RRC message relates to a traffic flow template received from the access point.

30. The apparatus of claim 28, wherein the one or more processors are configured to determine that the existing data radio bearer supports the one or more QoS parameters at least in part by determining that one or more QoS treatment parameters of the existing data radio bearer supports the one or more QoS parameters of the service data flow.

* * * * *